(12) United States Patent
Okamoto

(10) Patent No.: US 9,890,010 B2
(45) Date of Patent: Feb. 13, 2018

(54) SHEET POST-PROCESSING APPARATUS AND IMAGE FORMING APPARATUS FOR PERFORMING BINDING PROCESS

(71) Applicant: CANON FINETECH INC., Misato-shi, Saitama (JP)

(72) Inventor: Koji Okamoto, Tsukubamirai (JP)

(73) Assignee: Canon Finetech Nisca Inc., Misato-shi (JP)

( * ) Notice: Subject to any disclaimer, the term of this patent is extended or adjusted under 35 U.S.C. 154(b) by 0 days.

(21) Appl. No.: 14/697,847

(22) Filed: Apr. 28, 2015

(65) Prior Publication Data
US 2015/0321870 A1 Nov. 12, 2015

(30) Foreign Application Priority Data

May 9, 2014 (JP) .................................. 2014-097610
Apr. 10, 2015 (JP) .................................. 2015-081197

(51) Int. Cl.
*B65H 37/04* (2006.01)
*B65H 39/16* (2006.01)
(Continued)

(52) U.S. Cl.
CPC .............. *B65H 37/04* (2013.01); *B42B 4/00* (2013.01); *B65H 31/02* (2013.01); *B65H 31/3027* (2013.01); *B65H 31/36* (2013.01); *B65H 39/16* (2013.01); *B65H 43/00* (2013.01); *G03G 15/6544* (2013.01); *G06K 15/16* (2013.01); *B65H 2301/4212* (2013.01); *B65H 2301/4213* (2013.01); *B65H 2403/942* (2013.01);
(Continued)

(58) Field of Classification Search
CPC ........ B65H 37/04; B65H 39/16; B65H 43/00; G06K 15/16
USPC ................................................ 358/1.15, 1.14
See application file for complete search history.

(56) References Cited

U.S. PATENT DOCUMENTS 6,430,382 B1 * 8/2002 Okamoto ........... G03G 15/6538
399/82
8,141,862 B2 3/2012 Motoyoshi
(Continued)

FOREIGN PATENT DOCUMENTS

JP 11-240666 A 9/1999
JP 2010-120722 A 6/2010

OTHER PUBLICATIONS

Office Action in Japanese Patent Application No. 2015-081197, dated Mar. 15, 2016.

*Primary Examiner* — Andrew H Lam
(74) *Attorney, Agent, or Firm* — Fitzpatrick, Cella, Harper & Scinto

(57) ABSTRACT

Provided is a sheet post-processing apparatus capable of reliably protecting an edge-binding stapling unit and a sheet material, and of performing a sheet-binding process without increasing the size of the apparatus. The sheet post-processing apparatus includes: a binding unit movable to a binding position in which the binding unit performs a binding process using a binding member on a sheet, and an access position in which a user is accessable to the binding unit; and a control unit configured to cause, when the binding unit performs a setting operation for the binding member, the binding unit to perform the setting operation after causing the binding unit to move to a position different from the access position.

25 Claims, 15 Drawing Sheets

(51) Int. Cl.
  *B65H 43/00* (2006.01)
  *G06K 15/16* (2006.01)
  *B65H 31/02* (2006.01)
  *B65H 31/30* (2006.01)
  *B65H 31/36* (2006.01)
  *G03G 15/00* (2006.01)
  *B42B 4/00* (2006.01)

(52) U.S. Cl.
  CPC .. *B65H 2405/113* (2013.01); *B65H 2408/122* (2013.01); *B65H 2511/528* (2013.01); *B65H 2601/26* (2013.01); *B65H 2801/27* (2013.01); *G03G 2215/00818* (2013.01); *G03G 2215/00827* (2013.01); *G03G 2215/00831* (2013.01)

(56) References Cited

U.S. PATENT DOCUMENTS

| | | | |
|---|---|---|---|
| 2009/0261521 A1* | 10/2009 | Okamoto | B65H 37/04 270/37 |
| 2010/0123279 A1* | 5/2010 | Motoyoshi | B65H 37/04 270/58.09 |
| 2014/0011656 A1* | 1/2014 | Niikura | B65H 29/00 493/405 |

* cited by examiner

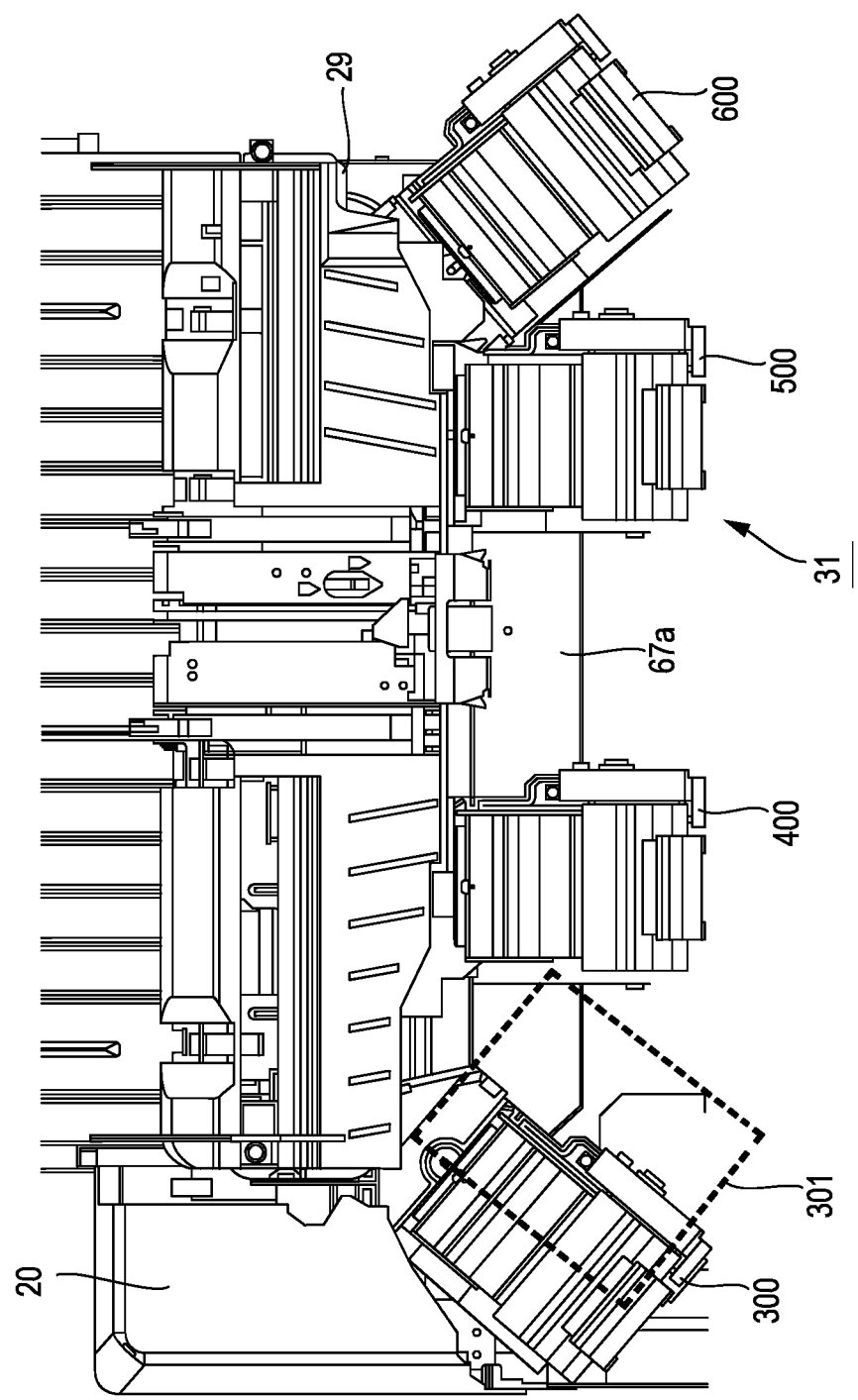

SHEET POST-PROCESSING APPARATUS AND IMAGE FORMING APPARATUS FOR PERFORMING BINDING PROCESS

BACKGROUND OF THE INVENTION

Field of the Invention

The present invention relates to a sheet post-processing apparatus, which is configured to perform a binding process for a sheet using a binding unit including a binding portion configured to drive a binding member through the sheet and bend the binding member, and to an image forming apparatus including the sheet post-processing apparatus.

Description of the Related Art

Hitherto, there is known a configuration in which a sheet post-processing apparatus is arranged in a post-stage of an image forming apparatus, which is configured to form an image using various types of image forming methods, to thereby perform a folding process or a bookbinding process. In particular, the sheet post-processing apparatus configured to perform the bookbinding process includes, for example, a stapler serving as a binding unit, and is configured to perform the bookbinding by stacking sheets conveyed from the image forming apparatus and binding the sheets for one book by the binding unit.

The binding unit such as the stapler includes a binding portion, which is configured to perform a binding operation of driving a staple serving as a binding member through a sheet by a driving force of a solenoid or a motor and bending the staple at a portion called an anvil. The staple is supplied to a cartridge of the stapler. The binding operation of the stapler may also be called a clinching operation.

When the binding process is performed on the sheet bundle by the stapler, a problem called jam, in which the staple is clogged at a portion in a stapler mechanism without being normally driven, may occur. Under such a state, the binding operation by the stapler cannot normally be performed. Also when all the staples loaded to the cartridge of the stapler are used, the binding operation by the stapler cannot normally be performed.

The stapler to be used in the sheet post-processing apparatus includes a detecting unit configured to detect that the stapler cannot normally drive the staple due to the jam or shortage of the staples. When the detecting unit detects that the stapler cannot normally drive the staple, the sheet post-processing apparatus generates an alert sound or displays an alert massage, to perform a temporarily stop.

The sheet post-processing apparatus disclosed in U.S. Pat. No. 8,141,862 controls the stapler to move to an access position for a user (or a service engineer) to perform a maintenance operation when the jam in the stapler or the shortage of the staples is detected.

The stapler subjected to the maintenance operation performs, when staples are replenished to the binding unit, a setting operation for setting the staple of the binding unit to a position (operation position), at which the staple is allowed to bind the sheet bundle, as in the sheet processing apparatus disclosed in Japanese Patent Application Laid-Open No. H11-240666. That is, the binding unit performs the setting operation in the stapler after the staples are replenished so as to reliably perform the binding process in the subsequent driving. After the maintenance operation such as the jam recovery operation (jam handling) and staple replenishment, the position of the staple is not identified inside the stapler. Therefore, the setting operation is performed as a pre-operation so that the staple is reliably driven in the clinching operation of the stapler when the binding process is performed on a subsequent sheet bundle. In the setting operation, for example, the stapler is caused to perform the clinching operation several times until the staple is fed to the operation position. This clinching operation is performed until the staple reaches the position at which the staple is driven.

In recent years, there is known a sheet post-processing apparatus additionally having a function of manual stapling in which the user inserts the sheet bundle to a position of the stapler through an opening portion formed in the sheet post-processing apparatus so that the stapler performs the binding process on the sheet bundle. In the manual stapling, the user performs positional alignment of the sheet bundle and the binding process by actuating the stapler through a button operation. Therefore, the stapler often performs the binding process at a position close to the user. In addition, the access position of the stapler, at which the user himself/herself performs the jam recovery operation or the staple replenishment, and a position of the opening portion, at which the manual stapling is performed, may be close to each other.

In such a configuration, at the time of the setting operation of the stapler, which is performed after the jam handling or the staple replenishment, when foreign matters are inserted from the opening portion of the sheet post-processing apparatus, the foreign matters may be bitten at the time of the clinching in the setting operation. The bite of the foreign matters may lead to a failure of the stapler. Further, when the sheet bundle is inserted from the opening portion at a timing when the stapler performs the setting operation, the sheet bundle may be flawed or damaged.

For example, a configuration in which the position of the opening portion for the manual stapling and the access position of the stapler are distanced from each other is conceivable. However, the configuration leads to an increase in size of the apparatus to increase costs.

SUMMARY OF THE INVENTION

In order to solve the above-mentioned problems, the present invention provides a sheet post-processing apparatus capable of protecting a stapler and a sheet material and performing a sheet-binding process without increasing the size of the apparatus.

In order to solve the above-mentioned problems, according to one embodiment of the present invention, there is provided a sheet post-processing apparatus, including: a binding unit movable to a binding position in which the binding unit performs a binding process using a binding member on a sheet, and an access position in which a user is accessable to the binding unit; and a control unit configured to cause, when the binding unit performs a setting operation for the binding member, the binding unit to perform the setting operation after causing the binding unit to move to a position different from the access position.

Further, according to another embodiment of the present invention, there is provided a sheet post-processing apparatus, including: a binding unit performing a binding process on a sheet to be inserted from an opening portion; and a regulating unit configured to regulate the sheet so that the sheet is prevented from being inserted from the opening portion when the binding unit performs a setting operation for a binding member.

Further, according to another embodiment of the present invention, there is provided an image forming apparatus, including: an image forming unit configured to form an image on a sheet; a binding unit movable to a binding position in which the binding unit performs a binding process using a binding member on the sheet having the image formed thereon by the image forming unit, and an access position in which a user is accessable to the binding unit; and a control unit configured to cause, when the binding unit performs a setting operation for the binding member, the binding unit to perform the setting operation after causing the binding unit to move to a position different from the access position.

Further, according to another embodiment of the present invention, there is provided an image forming apparatus, including: an image forming unit configured to form an image on a sheet; a binding unit performing a binding process on a sheet to be inserted from an opening portion; and a regulating unit configured to regulate the sheet so that the sheet is prevented from being inserted from the opening portion when the binding unit performs a setting operation for a binding member.

The present invention provides the excellent sheet post-processing apparatus capable of appropriately protecting the edge-binding stapling unit and the sheet bundle at the time of the setting operation of the binding unit.

Further features of the present invention will become apparent from the following description of exemplary embodiments with reference to the attached drawings.

BRIEF DESCRIPTION OF THE DRAWINGS

FIG. 11 is an explanatory top view of the access position of the edge-binding stapling unit of the sheet post-processing apparatus in FIG. 1.

DESCRIPTION OF THE EMBODIMENTS

Now, embodiments of the present invention are described with reference to the accompanying drawings.

Figure 1:
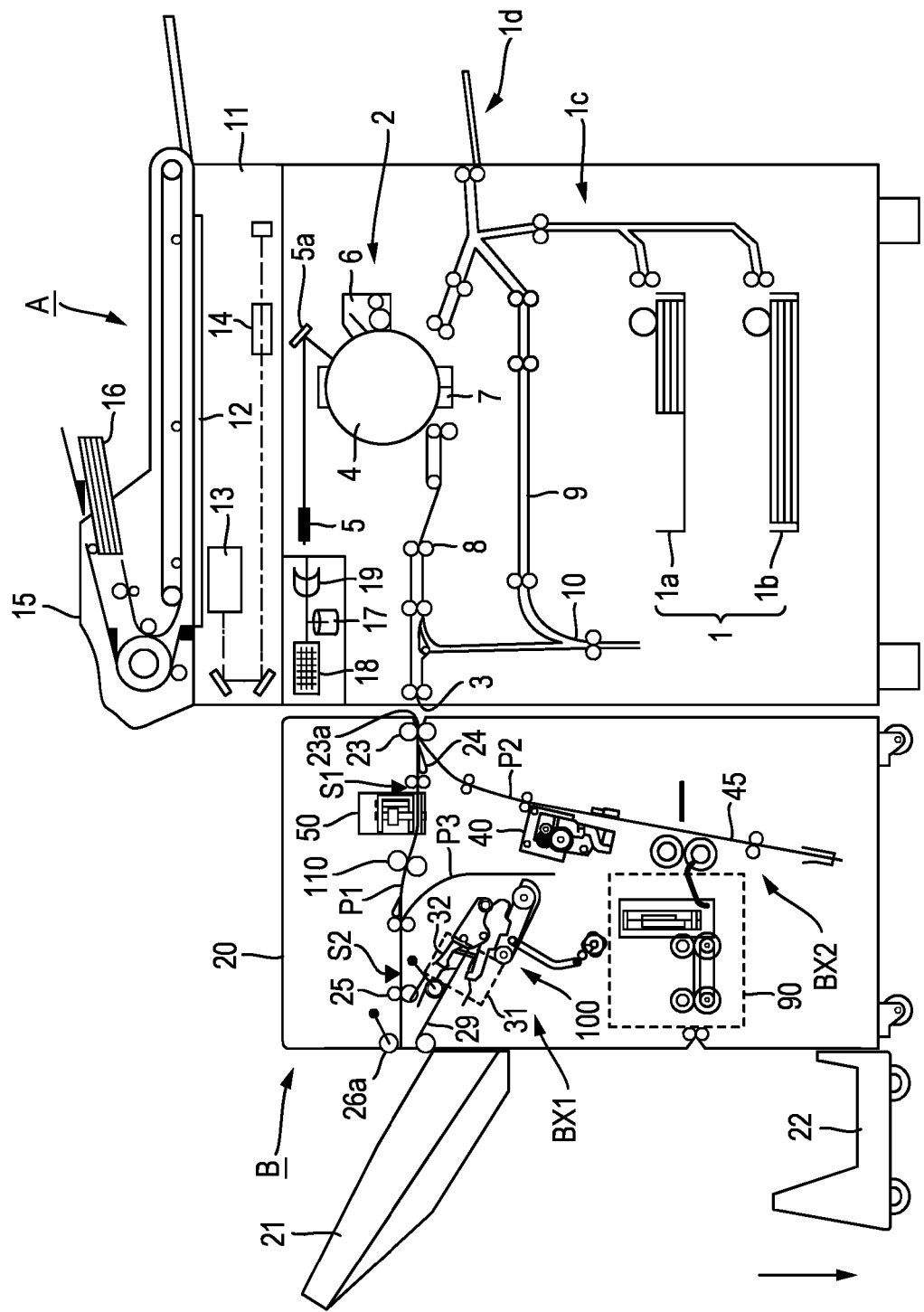
FIG. 1 is an explanatory view of an overall structure of an image forming system.

FIG. 1 illustrates an overall structure of an image forming system including a sheet post-processing apparatus B and an image forming apparatus A to be used together with the sheet post-processing apparatus B. The image forming system in FIG. 1 includes the image forming apparatus A and the sheet post-processing apparatus B. FIGS. 2 to 13 more specifically illustrate structures and operations of main parts of the sheet post-processing apparatus B to be used together with the image forming apparatus A in FIG. 1.

As illustrated in FIG. 1, the image forming system according to this embodiment includes the image forming apparatus A and the sheet post-processing apparatus B (an abbreviation "processing apparatus B" is also used hereinafter). In the image forming system according to this embodiment, a sheet feed and delivery path has construction in which a delivery port 3 of the image forming apparatus A and a carry-in port 23a of the processing apparatus B are coupled with each other. In the image forming system in FIGS. 1 and 2, sheets, which are subjected to image formation in the image forming apparatus A, are subjected to staple binding in the processing apparatus B, to thereby be delivered and received onto a stack tray 21 or a saddle tray 22.

The image forming apparatus A in FIG. 1 is roughly constructed as described below. When feeding and delivering the sheet, the image forming apparatus A in FIG. 1 feeds the sheet from a sheet feeding section 1 to an image forming section 2, prints an image on the sheet in the image forming section 2, and then delivers the sheet through the delivery port 3. The sheet feeding section 1 includes sheet feeding cassettes 1a and 1b configured to respectively receive a plurality of sheets (plain paper) different in size or sheet feeding direction. Further, the sheet feeding section 1 is configured to feed the sheets to the image forming section 2 through a conveyance path 1c after separating the sheets designated through a user operation one by one. The conveyance path 1c includes a sheet feeding guide and conveyance rollers configured to be driven by motors (not shown), and a manual feed path 1d is arranged in the middle of the conveyance path 1c as necessary.

FIG. 1 exemplifies the electrophotographic image forming section 2. Note that, the image forming method for the image forming apparatus A does not constitute an essential requirement of the present invention. Therefore, the image forming section 2 may be configured to form an image using another method such as ink jet method. The image forming section 2 in FIG. 1 includes an electrostatic drum 4, and an electrostatic latent image is formed on the electrostatic drum 4 by a laser emitter 5 serving as a recording head. Light modulated in accordance with a recording image signal from the laser emitter 5 is radiated to the electrostatic drum 4 through an optical system 5a including a mirror.

A developing device 6, a transfer charger 7, and a fixing device 8 are arranged in the vicinity of the electrostatic drum 4. The electrostatic latent image formed on the electrostatic drum 4 is developed with toner by the developing device 6. This toner image is transferred onto the sheet by the transfer charger 7, to thereby be heated and fixed by the fixing device 8.

The sheets having the images formed thereon are sequentially carried out from the delivery port 3. A circulation path 9 and a switchback path 10 are provided on a downstream side of the fixing device 8. For example, the sheet having the image printed on a front surface side thereof is fed from the fixing device 8 to the switchback path 10 through the circulation path 9, and is reversed between front and back in the switchback path 10, to thereby be fed to the image forming section 2 again. Those circulation path 9 and switchback path 10 are used, for example, when performing duplex printing for printing an image on a back surface side of the sheet. The sheet subjected to the duplex printing is reversed between front and back in the switchback path 10, to thereby be carried out from the delivery port 3.

The image forming apparatus A in FIG. 1 includes an image reading apparatus 11 for reading a document image on an upper part thereof. The image reading apparatus 11 is configured to scan a document sheet set on a platen 12 by a scan unit 13 and electrically read the image by a photoelectric conversion element (not shown) of the scan unit 13. The image data is subjected to, for example, digital processing in an image processing section, and is then transferred to and stored in a data storing portion 14.

In an operation (copy operation) of forming an image based on the read image data stored in the data storing portion 14, the read image data is converted into a recordable image signal, to thereby be transmitted to the laser emitter 5 serving as the recording head. A document feeding device 15 arranged above the image reading apparatus 11 is, for example, an automatic document conveying device (feeder device), and is configured to feed the document sheet, which is stacked on a stack tray 16, to the platen 12 so as to read an image of the document sheet. The platen 12 is formed of a transparent material such as glass, and is arranged over a scanning range of the scan unit 13.

The image forming apparatus A includes a control panel 18 serving as user interface unit. A user can set, through an operation of the control panel 18, desired image forming conditions (printing conditions) such as a sheet size designation, a color or monochrome printing designation, a designation of the number of print copies, a simplex or duplex printing designation, and an enlarged or reduced printing designation. A user interface unit, such as a liquid crystal display (LCD) and a key board, is arranged in the control panel 18.

Further, the image forming apparatus A includes a data storing portion 17 configured to accumulate the image data read by the scan unit 13 (or the image data transferred from an external network). The data storing portion 17 may be an external storage device such as an SSD and an HDD. At the time of image formation, the image data is transferred from the data storing portion 17 to a buffer memory 19, and then the data signal is sequentially transmitted from the buffer memory 19 to the laser emitter 5.

A sheet post-processing condition to be performed by the processing apparatus B can be designated through input on the control panel 18 as well as the image forming condition such as the simplex or duplex printing, the enlarged or reduced printing, and the monochrome or color printing. As the sheet post-processing condition, for example, a "print out mode", an "offset mode", a "binding finish mode", or a "booklet finish mode" can be selected. The above-mentioned binding process by the stapler is performed in the "binding finish mode" or the "booklet finish mode".

The processing apparatus B can perform sheet post-processing as described below.

(1) The processing apparatus B receives the sheets having the images formed thereon from the delivery port 3 of the image forming apparatus A and stacks the sheets in the stack tray 21.

(2) The processing apparatus B receives the sheets having the images formed thereon from the delivery port 3 of the image forming apparatus A, and aligns the sheets into a bundle to subject the sheets to the staple binding. The processing apparatus B then stacks the sheets in the stack tray 21.

(3) The processing apparatus B receives the sheets having the images formed thereon from the delivery port 3 of the image forming apparatus A, and aligns the sheets into a bundle to subject the sheets to the staple binding at their centers. The processing apparatus B then folds the sheets into a booklet and stacks the sheets in the saddle tray 22.

In order to perform the sheet post-processing, the carry-in port 23a is formed in a casing 20 (apparatus housing) of the processing apparatus B. The carry-in port 23a is arranged so as to be opposed to the delivery port 3 of the image forming apparatus A.

The casing 20 of the processing apparatus B includes a first processing section BX1 for aligning and stacking the sheets from the carry-in port 23a to finish the sheets through the binding, and a second processing section BX2 for aligning and stacking the sheets from the carry-in port 23a to finish the sheets into the booklet.

A first carry-in path P1 is formed between the first processing section BX1 and the carry-in port 23a, and a second carry-in path P2 is formed between the second processing section BX2 and the carry-in port 23a. The sheets carried in from the carry-in port 23a are sorted to be respectively guided into the first processing section BX1 and the second processing section BX2. Therefore, a sheet sensor S1 and a path switching unit 24 (flapper member), which is configured to sort the sheets to the first carry-in path P1 or the second carry-in path P2, are arranged on a downstream side of carry-in rollers 23 arranged to face the carry-in port 23a.

A punch unit 50 and a buffer path P3 are arranged on the first carry-in path P1. The punch unit 50 is, for example, a mechanism for punching a circular hole in the sheet bundle, and is configured to punch a circular hole for binding for a binder in the sheet bundle.

Figure 2:
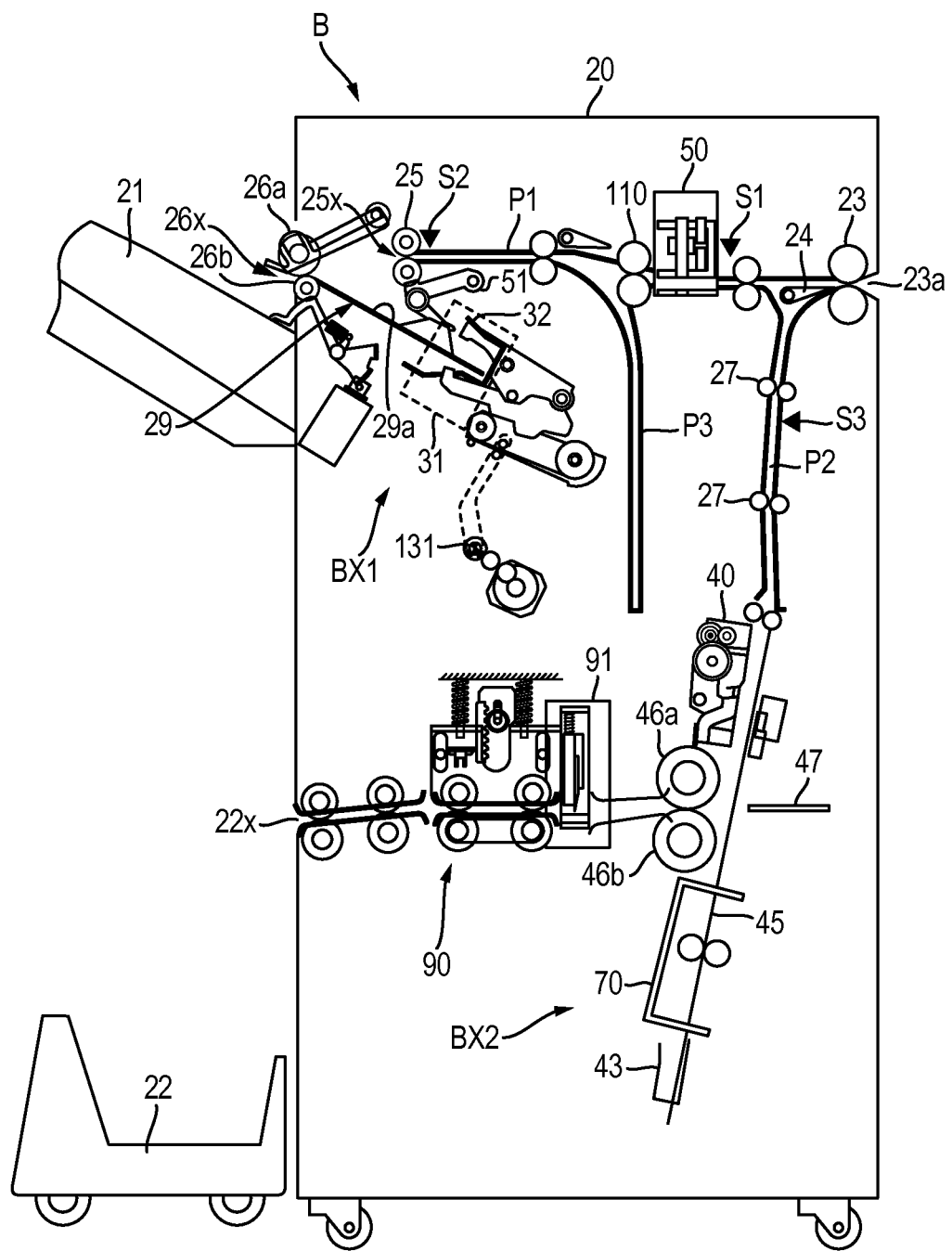
FIG. 2 is an explanatory view of an overall structure of a sheet post-processing apparatus in FIG. 1.

The buffer path P3 is formed in the middle of the path connected to a processing tray 29. When the sheet bundle aligned and stacked on the processing tray 29 is subjected to the post-processing such as the staple binding, a subsequent sheet, which is fed to the carry-in port 23a during the post-processing operation, is temporarily caused to stay on the buffer path P3. That is, in the first carry-in path P1, the buffer path P3 is arranged on an upstream side of the path connected to the processing tray so as to be branched in a vertical direction of the casing 20 as illustrated in FIG. 1. Then, the sheet from the first carry-in path P1 is reversed, and is caused to stay on the buffer path P3 (FIGS. 1 and 2). With such a configuration, when the sheet bundle aligned and stacked on the processing tray 29 is subjected to the post-processing (edge-binding process), the subsequent sheet fed to the carry-in port can be temporarily caused to stay on the buffer path P3. The subsequent sheet, which is caused to stay on the buffer path P3, can be conveyed from the buffer path P3 to the processing tray 29 after the processed sheets on the processing tray 29 are carried out.

The first carry-in path P1 is provided in an upper portion of the casing 20 (apparatus housing) in a substantially horizontal direction. The first processing section BX1 is provided on a downstream side of the first carry-in path P1, and the stack tray 21 is arranged on a downstream side of the first processing section BX1. Further, the second carry-in path P2 is provided in a lower part of the casing 20 in a substantially vertical direction. The second processing section BX2 is provided on a downstream side of the second carry-in path P2, and the saddle tray 22 is arranged on a downstream side of the second processing section BX2. The punch unit 50 and a shift roller unit 110 are arranged in a portion of the first carry-in path P1 between the carry-in port 23a and the first processing section BX1. A trimmer unit 91 is arranged in a portion of the second carry-in path P2 between the second processing section BX2 and the saddle tray 22.

Figure 3:
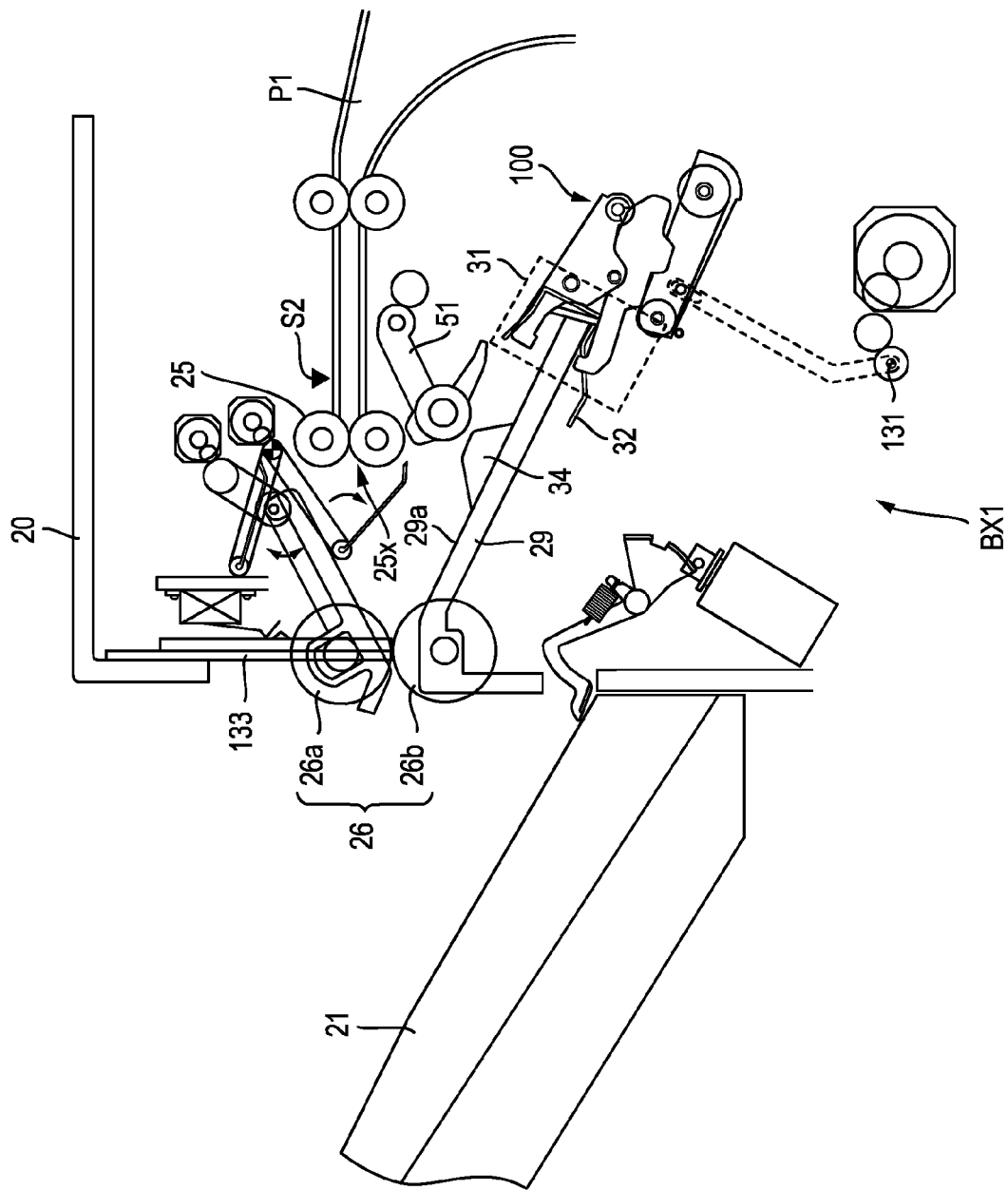
FIG. 3 is an explanatory view of a main part of the sheet post-processing apparatus in FIG. 1.

In addition, as illustrated in FIGS. 2 and 3, delivery rollers 25 and a delivery port 25x are arranged on an outlet side of the first carry-in path P1. Further, a delivery sensor S2 configured to detect the sheet passing through the first carry-in path P1 is arranged in the vicinity (upstream side) of the delivery port 25x. With the delivery sensor S2, the jam can be detected and the number of the passing sheets can be counted. Further, the processing tray 29 is arranged on a downstream side of the delivery port 25x with a level difference. Conveyance rollers 27 are arranged on the second carry-in path P2 (FIG. 2), and a stacking guide 45 is arranged on a downstream side of the conveyance rollers 27 with a level difference.

Figure 6:
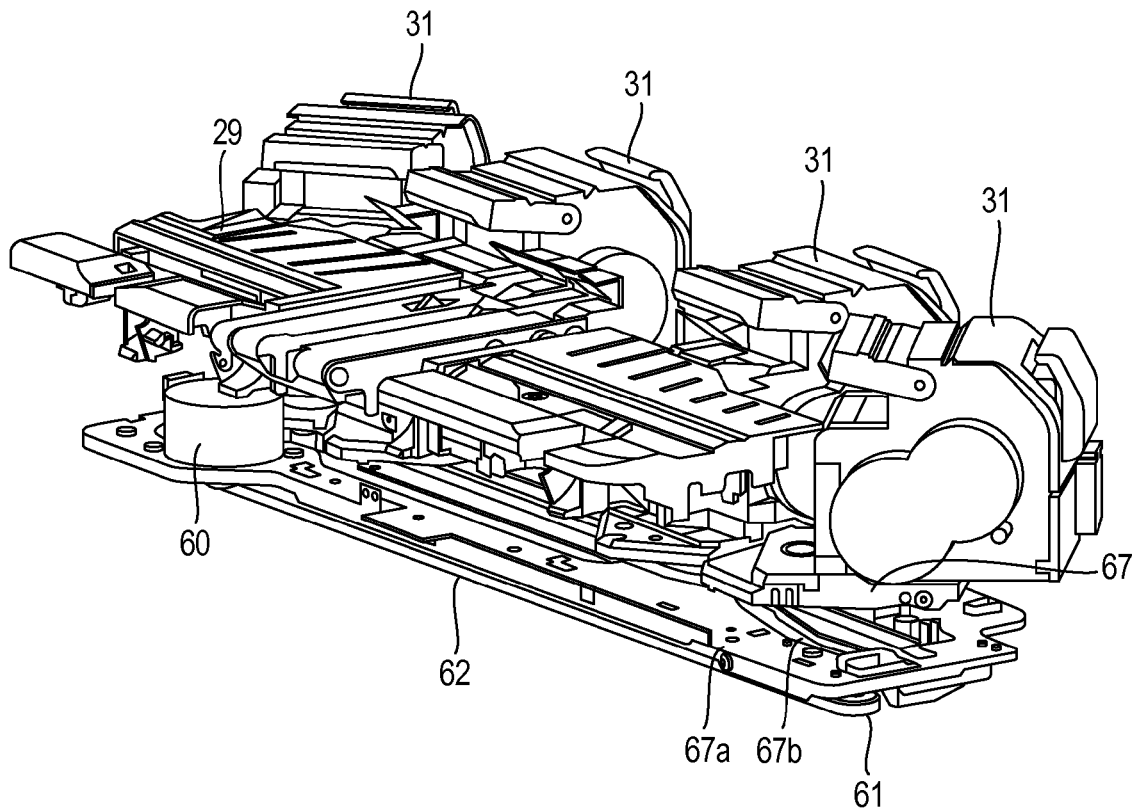
FIG. 6 is a structural view of a moving unit of an edge-binding stapling unit of the sheet post-processing apparatus in FIG. 1.

The first processing section BX1 includes the processing tray 29 arranged on the first carry-in path P1, an edge-binding stapling unit 31 arranged on the processing tray 29, and a slip roller 51. The edge-binding stapling unit 31 is movable over a substantially width direction of the sheet by a mechanism described later (FIG. 6). Therefore, a position of the edge-binding stapling unit 31 is indicated by the broken line in FIGS. 1 to 3.

Figure 4:
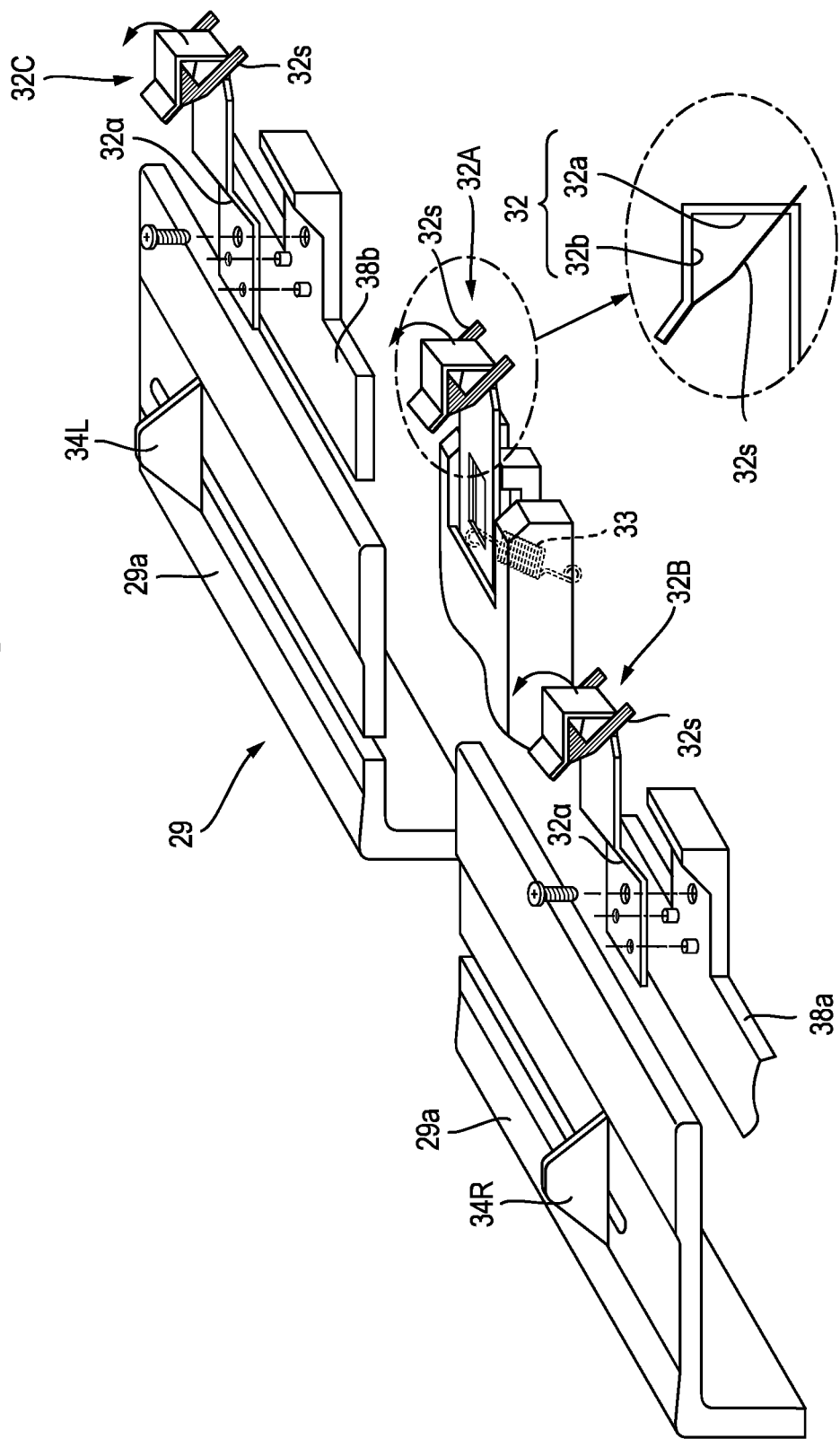
FIG. 4 is an explanatory view of a structure of a trailing-edge regulating unit and an alignment unit of a processing tray of the sheet post-processing apparatus in FIG. 1.

As illustrated in FIGS. 2 and 3, the processing tray 29 is formed of a synthetic resin plate, and includes a sheet supporting surface 29a configured to stack and support the sheets. FIG. 4 illustrates a structure of the processing tray 29 in a form of a perspective view.

The sheet supporting surface 29a is arranged on the downstream side of the delivery port 25x with a level difference (FIG. 4), and is configured to stack and receive the sheets fed from the delivery port 25x. The sheet supporting surface 29a is formed to have a length dimension smaller than a length of the sheet in a delivery direction thereof, and is configured to support a trailing edge portion of the sheet fed from the delivery port 25x. A leading edge portion of the sheet is supported above an uppermost sheet on the stack tray 21 (so-called bridge support).

A sheet-edge regulating unit 32 is arranged in the processing tray 29, and the trailing edge (or may be the leading edge) of the sheet fed from the delivery port 25x is caused to abut against the sheet-edge regulating unit 32 so that the sheet can be aligned. Switchback rollers 26, the slip roller 51, and a side alignment unit are arranged above the processing tray 29. The switchback rollers 26 are configured to convey the sheet carried onto the tray to the sheet-edge regulating unit 32. The switchback rollers 26 include a movable roller 26a and a fixed roller 26b (FIGS. 2 and 3).

The second processing section BX2 is now described. The second processing section BX2 includes the stacking guide 45 arranged on the second carry-in path P2, a saddle-stitch stapling unit 40 arranged on the stacking guide 45, folding rollers 46a and 46b, and a pressing plate 47 (FIG. 2).

The stacking guide 45 is arranged continuously with the downstream side of the second carry-in path P2, and is configured to sequentially stack and receive the sheets thereon, which are fed from the carry-in port 23a, in a standing posture. The stacking guide 45 is arranged in the substantially vertical direction so as to vertically cross the casing 20, and is configured to stack the sheets in a standing posture. Further, the stacking guide 45 is formed of a guide plate bent at the center thereof, and has such a length that the stacking guide 45 receives a sheet having a maximum size therein. That is, the stacking guide 45 has a shape curved or bent so as to protrude to a side on which the saddle-stitch stapling unit 40 is arranged. Further, a leading-edge stopper 43, which is configured to regulate the leading edge of the sheet, is arranged on the stacking guide 45, and the leading-edge stopper 43 is movable in accordance with the sheet size (length in the delivery direction).

The sheet, which is positioned in a conveyance direction by the conveyance rollers 27 and the leading-edge stopper 43, is positioned in the width direction by side alignment plates 70.

The side alignment plates 70 are arranged in pairs respectively on a far side and a near side of the stacking guide 45, and are configured to align the sheet through the same amount of movement with the center as a reference similarly to the side alignment unit 34.

After the alignment, the saddle-stitch stapling unit 40 performs the binding process. Then, the pressing plate 47 presses the center of the sheet bundle, and the folding rollers 46a and 46b fold the sheet bundle, to thereby convey the sheet bundle to the trimmer unit 91.

The trimmer unit 91 performs a trimming process on an edge surface of the sheet bundle on the downstream side (edge portion) depending on selection by the user. Then, the sheet bundle is caused to pass through a bundle-conveyance path 90 and stacked on the saddle tray 22.

Now, each component of the processing apparatus B is described in more detail.

Regarding the first processing section BX1, as illustrated in FIGS. 2, 3, and 4, the sheet-edge regulating unit 32, which is configured to position one of the leading edge and the trailing edge of the sheet carried onto the processing tray 29, is arranged on an end portion of the processing tray 29 on the right side in FIGS. 2, 3, and 4. As illustrated in FIG. 4, the sheet-edge regulating unit 32 includes a stopper member including a sheet edge-surface regulating surface 32a against which the trailing edge of the sheet is abutted to regulate, and a sheet upper-surface regulating surface 32b configured to regulate a position of an upper surface of an uppermost sheet. The sheet-edge regulating unit 32 is arranged in the trailing edge of the processing tray 29 (edge on the right side in FIGS. 2 to 4).

The sheet-edge regulating unit 32 is configured to regulate the trailing edge of the sheet, which is conveyed by the switchback rollers 26 and the slip roller 51 and abutted against the sheet-edge regulating unit 32, thereby positioning the sheet at a preset position (hereinafter referred to as "binding position") for the post-processing to be performed by the edge-binding stapling unit 31. At this time, the sheet upper-surface regulating surface 32*b* regulates a warped surface of the sheet curled at the trailing edge, and the sheet edge-surface regulating surface 32*a* regulates a position of the edge of the sheet.

As illustrated in FIG. 4, the sheet edge-surface regulating surface 32*a* and the sheet upper-surface regulating surface 32*b* are the stopper member integrally formed of a resin or a metal plate. However, both the regulating surfaces may be formed as separate members. The sheet-edge regulating unit 32 illustrated in FIG. 4 includes, as a plurality of the stopper members, a fixed stopper member 32A arranged in the center in the width direction of the sheet, and a first movable stopper member 32B and a second movable stopper member 32C respectively arranged in right and left edge portions in the width direction of the sheet. Note that, as illustrated in a partially enlarged manner in FIG. 4, the fixed stopper member 32A includes a correction member 32*s* fixed to the stopper member, which is configured to correct the curl of the leading edge of the sheet. The correction member 32*s* is formed into a substantially C-shape, and functions to correct the curl of the leading edge of the sheet in a space between the sheet edge-surface regulating surface 32*a* and the sheet upper-surface regulating surface 32*b*. Similarly, the first movable stopper member 32B and the second movable stopper member 32C each include the correction member 32*s*.

Further, the first movable stopper member 32B and the second movable stopper member 32C, which are respectively located at the right and left edge portions in the width direction of the sheet, are movable in accordance with the sheet size (FIG. 4). Therefore, a right sliding member 38*a* and a left sliding member 38*b* are fitted and supported to a bottom surface wall of the processing tray 29 so as to be movable in the width direction of the sheet. The first movable stopper member 32B is fixed to the right sliding member 38*a*, and the second movable stopper member 32C is fixed to the left sliding member 38*b*. The right sliding member 38*a* and the left sliding member 38*b* are respectively coupled to an alignment plate 34R and an alignment plate 34L, which are configured to align the sheet sides, so that the right sliding member 38*a* and the left sliding member 38*b* move in association therewith.

In the sheet-edge regulating unit 32, at least the sheet upper-surface regulating surface 32*b* is vertically movable in a sheet stacking direction. This is because, when a sheet-bundle carry-out unit 100 carries out the sheet bundle stacked on the processing tray 29 from the tray, the sheet-bundle carry-out unit 100 may lift up the sheet bundle stacked on the tray. The sheet upper-surface regulating surface 32*b* is movable upward following the upward movement of the sheet bundle.

Therefore, as illustrated in FIG. 4, the fixed stopper member 32A is axially supported on the bottom wall of the processing tray 29 in a pivotable manner, and is urged and supported by an urging spring 33 toward the lower side in FIG. 4. Further, the first movable stopper member 32B and the second movable stopper member 32C are respectively fixed to the right sliding member 38*a* and the left sliding member 38*b* by each screwing an elastically deformable portion (32α).

As a sheet conveyance unit configured to guide the sheet, which is carried in from the delivery port 25*x*, to the sheet-edge regulating unit 32, the switchback rollers 26 are arranged on the processing tray 29. In addition to the case where the sheet conveyance unit includes the movable roller 26*a* and the fixed roller 26*b*, the sheet conveyance unit may include a frictional rotary member such as a belt. The switchback rollers 26 are configured to convey the sheet, which is carried out from the delivery port 25*x* to the processing tray 29, to the sheet-edge regulating unit 32.

Figure 5:
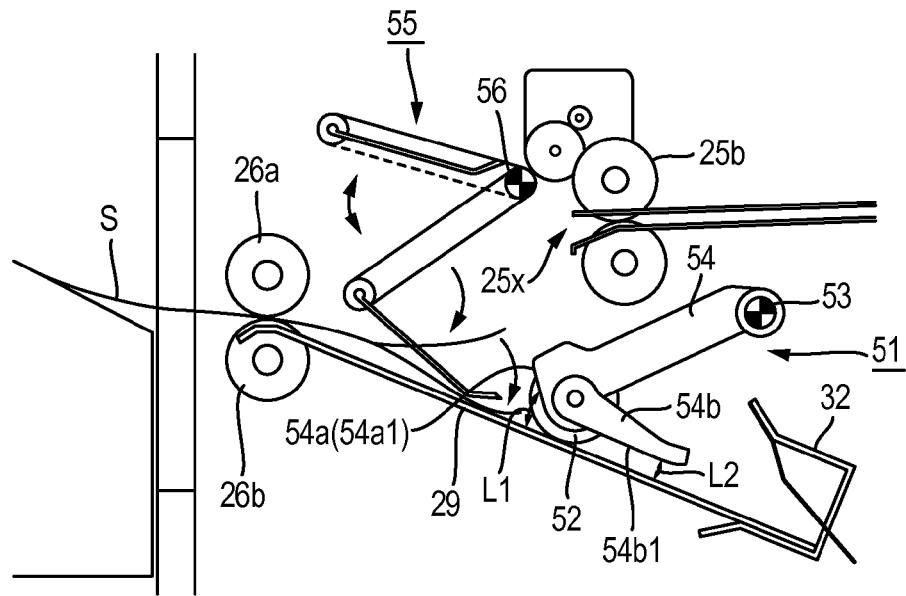
FIG. 5 is an explanatory view of an operation when a sheet is dragged on the processing tray of the sheet post-processing apparatus in FIG. 1.

The slip roller 51, which is configured to convey the sheet to the sheet-edge regulating unit 32 together with the switchback rollers 26, is arranged above the processing tray 29. The slip roller 51 includes a frictional rotary member 52. As illustrated in FIG. 5, the frictional rotary member 52 is arranged below the delivery port 25*x*, and is configured to convey the sheet, which is carried onto the processing tray 29, to the sheet-edge regulating unit 32 while dragging the trailing edge of the sheet. Further, the switchback rollers 26 are configured to be driven by a driving unit (not shown) so as to abut or retreat with respect to the processing tray 29. The switchback rollers 26 and the slip roller 51 can determine the conveyance direction of the sheet.

The side alignment unit 34 arranged on the processing tray 29 is configured to perform side alignment (width alignment) of the sheet carried in from the delivery port 25*x* to the processing tray 29. The side alignment unit 34 is configured to perform side alignment (width alignment) of the sheet relative to a center reference, which means that positional alignment is performed with the center of the sheet carried onto the processing tray 29 as a reference, or relative to a side reference, which means that positional alignment is performed with a right or left side edge of the sheet in the width direction thereof as a reference (FIG. 4).

For example, as illustrated in FIG. 4, the side alignment unit 34 includes the left alignment plate 34L to be engaged with the left side edge of the sheet on the processing tray 29, and the right alignment plate 34R to be engaged with the right side edge of the sheet. The left alignment plate 34L and the right alignment plate 34R are respectively fitted to and supported by guide grooves formed in the sheet supporting surface 29*a* of the processing tray 29, and are movable in the width direction of the sheet. Further, an alignment-plate moving unit (not shown) is coupled to the bottom portion of the processing tray 29, and the alignment-plate moving unit laterally moves the left alignment plate 34L and the right alignment plate 34R in the width direction of the sheet. With this, the sheet can be aligned relative to the center reference or offset by a predetermined amount to be aligned relative to the side reference. With this, when the aligned sheet bundle is to be bound at the corner, the position of the sheet in the width direction is determined.

After the sheet is positioned in the conveyance direction and the width direction, a binding unit, that is, the edge-binding stapling unit 31, performs the edge-binding process in accordance with the mode selected by the user. Then, the sheet bundle, which is edge-bound by the sheet-bundle carry-out unit 100, is stacked on the stack tray 21. Alternatively, the sheet bundle is not subjected to the binding process by the sheet-bundle carry-out unit 100 and is carried out so as to be stacked on the stack tray 21.

The edge-binding stapling unit 31 is now described. As an edge-binding (staple) method to be used in this type of the apparatus, there are given a method involving binding with a metallic staple and a method involving binding the sheet bundle by cutting parts of the sheets of the sheet bundle so as to be deformed, thereby tangling the parts. In this embodiment, the case of binding with the metallic staple is described. As the staple (binding member), the metallic staple is hereinafter used, and the terms "staple" and "metallic staple" are used as necessary.

The edge-binding stapling unit 31 using the metallic staple as the staple according to this embodiment is coupled to a staple slider 67 as illustrated in FIG. 6. The staple slider 67 can move the edge-binding stapling unit 31 along the edge side of the sheet stacked on the processing tray 29. Thereby, the edge-binding stapling unit 31 is movable to, for example, different binding positions on the edge side of the sheet which is conveyed in the housing. The edge-binding stapling unit 31 is movable to a predetermined staple-binding position through intermediation of the staple slider 67 by a staple motor 60, staple moving pulleys 61, and a staple moving belt 62. The staple slider 67, the staple motor 60, the staple moving pulleys 61, and the staple moving belt 62 are arranged on a staple guide unit 67a. The staple guide unit 67a has a guide groove 67b configured to move the edge-binding stapling unit 31 along the edge side of the sheet via the staple guide unit 67a.

With the above-mentioned mechanism, the edge-binding stapling unit 31 is movable to the different binding positions on the edge of the sheet, an access position, or a position for a protection measure. FIG. 6 illustrates, for example, all the edge-binding staple units 31 respectively moved to four positions. Among four postures of the edge-binding staple units 31 in FIG. 6, two postures at the both ends are inclined with respect to the processing tray 29 so as to obliquely drive the staple, for example, onto a corner of the sheet on the processing tray 29. The positions and the postures of the edge-binding staple units 31 can be controlled as shown in FIG. 6 by moving the staple slider 67 along a shape of the guide groove 67b of the staple guide unit 67a.

The staple slider 67, which is coupled to the edge-binding stapling unit 31, is coupled, at a given portion (not shown), to the staple moving belt 62 stretched around the staple moving pulleys 61 below the staple guide unit 67a. Further, in order to move the edge-binding stapling unit 31 to the predetermined position, the staple guide unit 67a has the guide groove 67b to be engaged with a base portion of the staple slider 67 to guide the staple slider 67. When one of the staple moving pulleys 61 is driven through intermediation of the staple motor 60, the edge-binding stapling unit 31 can be moved to the predetermined binding position (or the access position or the protection position). Especially, in the embodiment, the guide groove 67b has, for example, a shape configured to move the edge-binding staple units 31 to the access position 300 (described later) or a protection position 301, other than the different binding positions on the edge side of the sheet shown in FIG. 6.

A moving unit for the edge-binding stapling unit 31 includes the staple motor 60, the staple moving pulleys 61, the staple moving belt 62, the staple slider 67, and the staple guide unit 67a. With this moving unit, the edge-binding stapling unit 31 (binding unit) can be moved to the predetermined binding position for the sheets or the access position 300 (described later) at which the user is allowed to access the edge-binding stapling unit 31 for a maintenance operation.

Figure 7A:
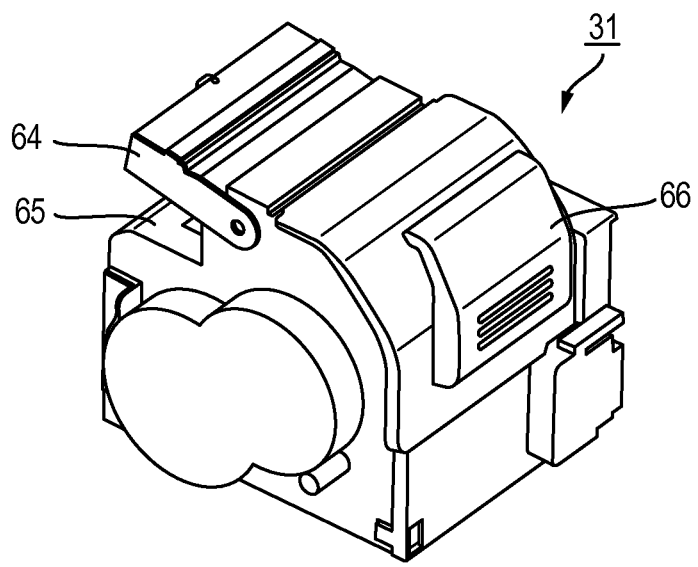
FIG. 7A is an explanatory view of an internal structure of the edge-binding stapling unit of the sheet post-processing apparatus in FIG. 1 under a state in which a cartridge is mounted to the edge-binding staple unit.
Figure 7B:
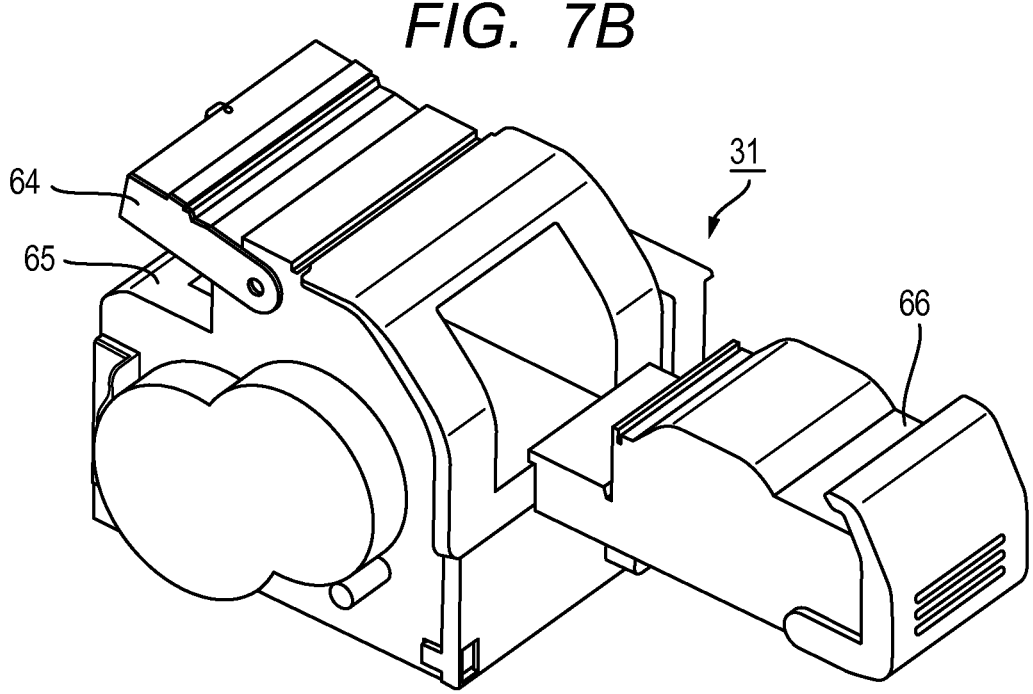
FIG. 7B is an explanatory view of the internal structure of the edge-binding stapling unit of the sheet post-processing apparatus in FIG. 1 under a state in which the cartridge is pulled out from the edge-binding staple unit.

FIGS. 7A and 7B illustrate the edge-binding stapling unit 31. As illustrated in FIG. 7A, the edge-binding stapling unit 31 includes a cartridge 66 configured to receive the staple, and a driver 64 configured to drive the staple through the sheet by a pivoting operation. Further, an anvil 65, which is configured to bend the driven staple, is provided so as to be opposed to an operation portion of the driver 64. FIG. 7B illustrates a state in which the cartridge 66, which is configured to receive the staple, is pulled out from the edge-binding stapling unit 31. For example, when the staples are replenished to the cartridge 66 through the maintenance operation, the cartridge 66 can be pulled out from the edge-binding stapling unit 31 as illustrated in FIG. 7B.

Next, cartridge mount and dismount work and a setting operation of the edge-binding stapling unit 31 are described.

The cartridge 66 is required to be dismounted from the edge-binding stapling unit 31, for example, when the edge-binding stapling unit 31 causes a staple jam or when the cartridge 66 requires staple replenishment. The "staple jam" herein indicates a state in which the staple is entangled inside the edge-binding stapling unit 31 to disable a normal operation of the edge-binding stapling unit 31. Further, also when the remaining number of the unused staples inside the cartridge 66 becomes zero, the edge-binding operation is naturally impossible. In this case, the staple replenishment is required.

In general, the edge-binding stapling unit 31 includes a sensor configured to detect the occurrence of the staple jam state or the remaining amount of the staples. This type of sensor provided in the edge-binding stapling unit 31 is publicly known, and the detailed description thereof is omitted herein. For example, a control circuit (FIG. 14) is configured to determine whether or not the edge-binding stapling unit 31 can normally drive the staple through comprehensive consideration of an output state of the sensor serving as a detecting unit, which is provided in the edge-binding stapling unit 31.

When the detecting unit detects that the edge-binding stapling unit 31 cannot normally drive the staple, the sheet post-processing operation is stopped during the normal sheet post-processing operation irrespective of whether the staple jam or the shortage of the staples has occurred. Then, it is notified the user by the control panel 18 of the image forming apparatus A, that abnormality occurs in the edge-binding stapling unit 31, or the maintenance operation, such as a jam recovery operation and the staple replenishment, is required. Note that, which of the jam recovery operation and the staple replenishment is required can be displayed on the control panel 18 in accordance with the output state of the sensor provided in the edge-binding stapling unit 31.

The maintenance operation for the edge-binding stapling unit 31, such as the jam recovery operation and the staple replenishment, is performed after moving the edge-binding stapling unit 31 to the specific access position. The "access position" herein indicates a position at which the user (or a service engineer) can "access" the mechanism of the edge-binding stapling unit 31.

Figure 8:
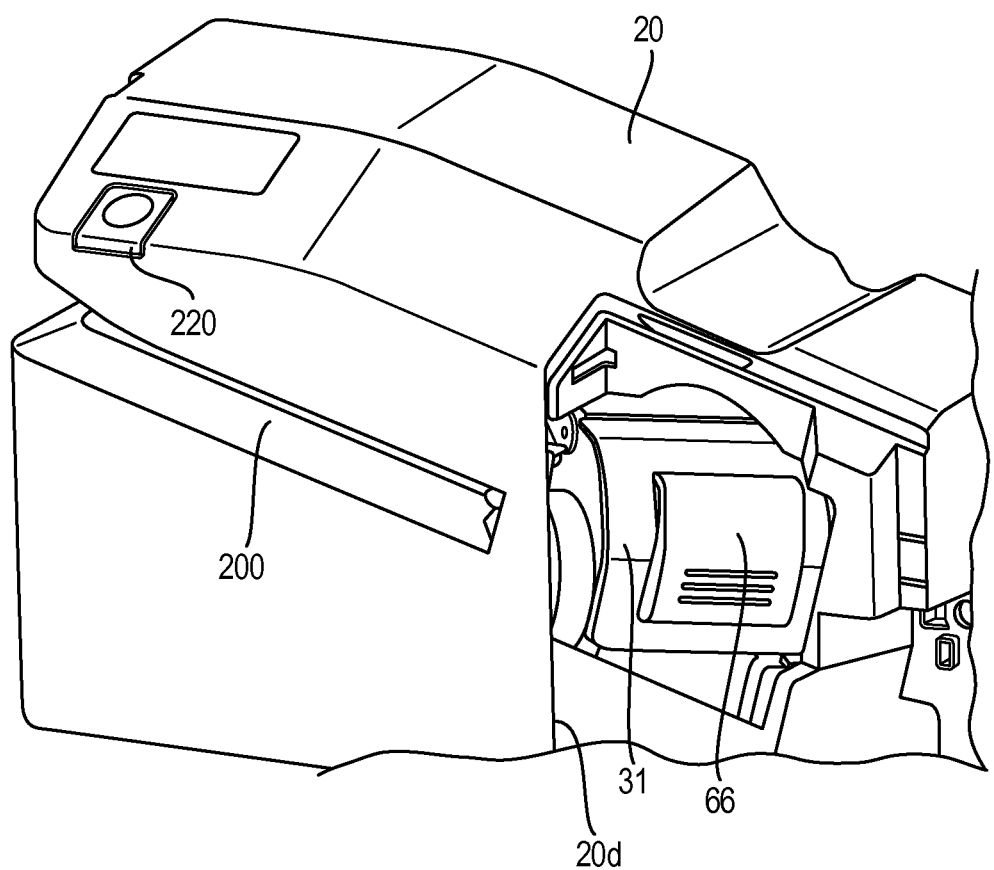
FIG. 8 is an explanatory view of a state in which the edge-binding stapling unit is moved to an access position in the sheet post-processing apparatus in FIG. 1.

FIG. 8 exemplifies a state in which the edge-binding stapling unit 31 is moved to the access position so that the user (or the service engineer) can "access" it. The access position of the edge-binding stapling unit 31 in FIG. 8 corresponds to the access position 300 in FIG. 11 (described later).

FIG. 8 illustrates a state in which a cover (not shown) on the right side in FIG. 8, which is arranged on the casing 20, is open. In this state, the user (or the service engineer) can access the edge-binding stapling unit through an opening portion 20d, and can perform the maintenance operation, for example, including pull out of the cartridge 66 (FIG. 7B).

When a state in which the normal operation of the edge-binding stapling unit 31 cannot be performed is detected, the control circuit causes the edge-binding stapling unit 31 to move to the access position during the mount and dismount work for the cartridge 66. Then, at the access position, the user (or the service engineer) can perform the maintenance operation for the edge-binding stapling unit 31, such as the recovery operation from the jam of the binding member (staple) or the replenishment of the binding members (staples).

After the user (or the service engineer) performs the maintenance operation (jam recovery operation or staple replenishment), the user mounts the cartridge 66 to the edge-binding stapling unit 31 again. Then, when the cartridge 66 is mounted to the edge-binding stapling unit 31, the control circuit causes the edge-binding stapling unit 31 to perform the setting (so-called staple-setting) operation.

Figure 9A:
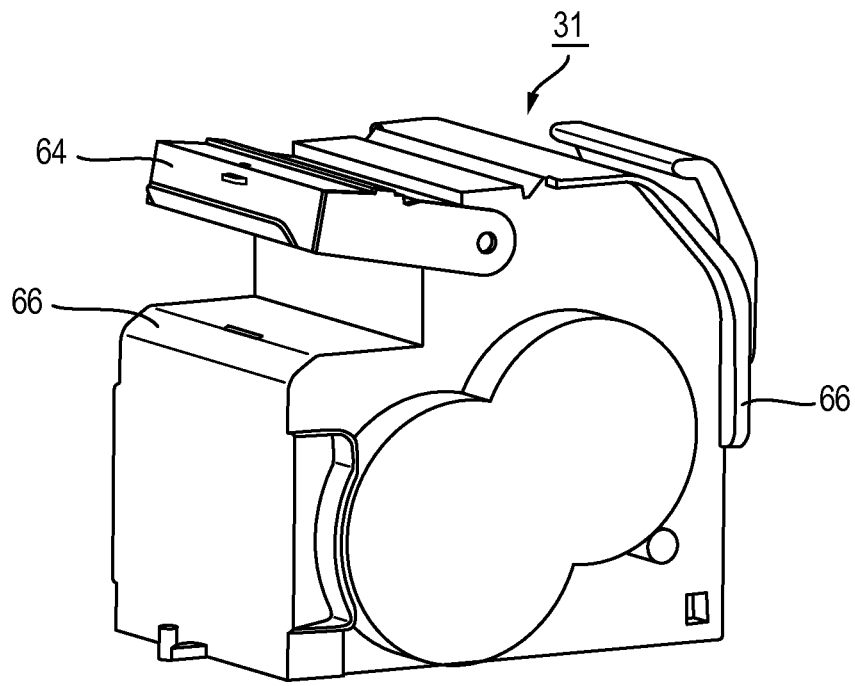
FIG. 9A is an explanatory view of a setting operation of the edge-binding stapling unit of the sheet post-processing apparatus in FIG. 1 under a normal state.
Figure 9B:
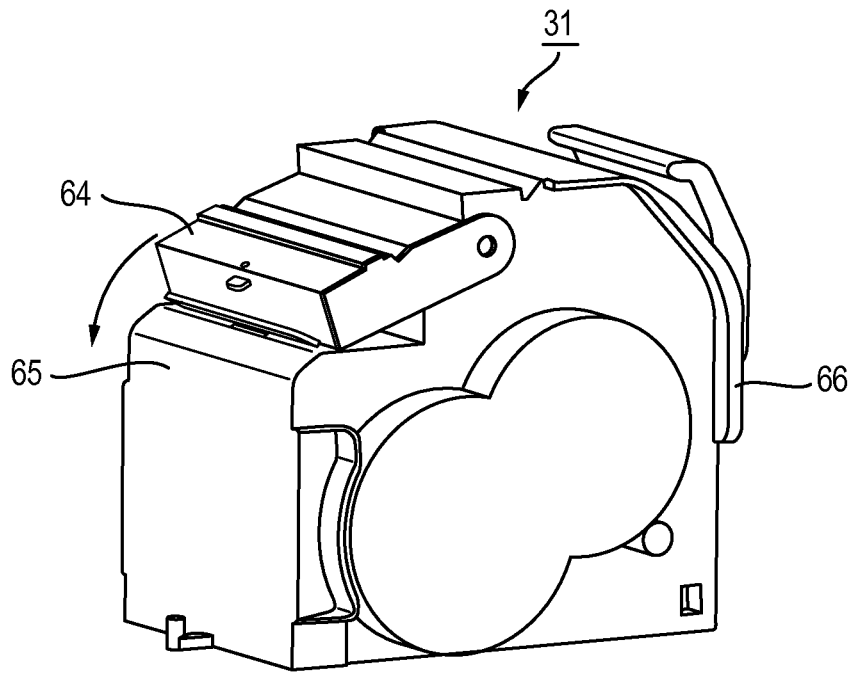
FIG. 9B is an explanatory view of the setting operation of the edge-binding stapling unit of the sheet post-processing apparatus in FIG. 1 under a clinching state.

In this case, FIGS. 9A and 9B respectively illustrate different operation states of the edge-binding stapling unit 31. FIG. 9A illustrates a normal (standby) state, and FIG. 9B illustrates a clinching state when the staple is driven to be clinched. In a setting (staple-setting) operation, in order to push out the staple inside the cartridge 66, a clinching operation involving transition from the state in FIG. 9A to the state in FIG. 9B is repeated several times. The setting operation is performed because the position of the staple is not identified inside the cartridge 66, and is a pre-operation for reliably performing a subsequent stapling operation from the start.

Conventionally, the setting operation is performed at the access position of the edge-binding stapling unit 31 illustrated in FIG. 8. For example, after the maintenance operation, when the cartridge 66 is mounted to the edge-binding stapling unit 31, the clinching operation for setting is performed at the mounting position. In the access position, the edge-binding stapling unit 31 is at a position close to outside of the apparatus so that the user (or the service engineer) easily performs the maintenance operation.

In recent years, the sheet post-processing apparatus may additionally have a so-called manual stapling function in which the user inserts the sheet bundle to the vicinity of the edge-binding stapling unit through a manual operation to perform the binding process on the sheet bundle. In the sheet post-processing apparatus having such a manual stapling function, for example, as illustrated in FIG. 8, an opening portion 200 is formed in a part of the casing 20, and the sheet bundle can be inserted to the vicinity of the edge-binding stapling unit through the opening portion 200. In the binding position for the manual stapling, it is preferable that the edge-binding stapling unit 31 performs the binding operation at the position close to outside of the apparatus in order to improve operability for the user. Therefore, in the constitution illustrated in FIG. 8, the access position is close to the binding position for the manual stapling. In this constitution, when the setting is performed at the access position after the maintenance operation, a problem, such as the flawing of the sheet inserted through the opening portion 200, may occur (e.g. refer to FIG. 10B described later).

This manual stapling is a stapling (binding) process that the user performs on the sheet bundle through the manual operation. In the manual stapling, for example, the user inserts the sheet bundle into the opening portion 200 and operates a switch (for example, a switch 220) arranged on the casing 20 for instructing the manual stapling. With this, the edge-binding stapling unit 31 performs the stapling process on the sheet bundle inserted to the position of the driver 64 through the opening portion 200.

Figure 16:
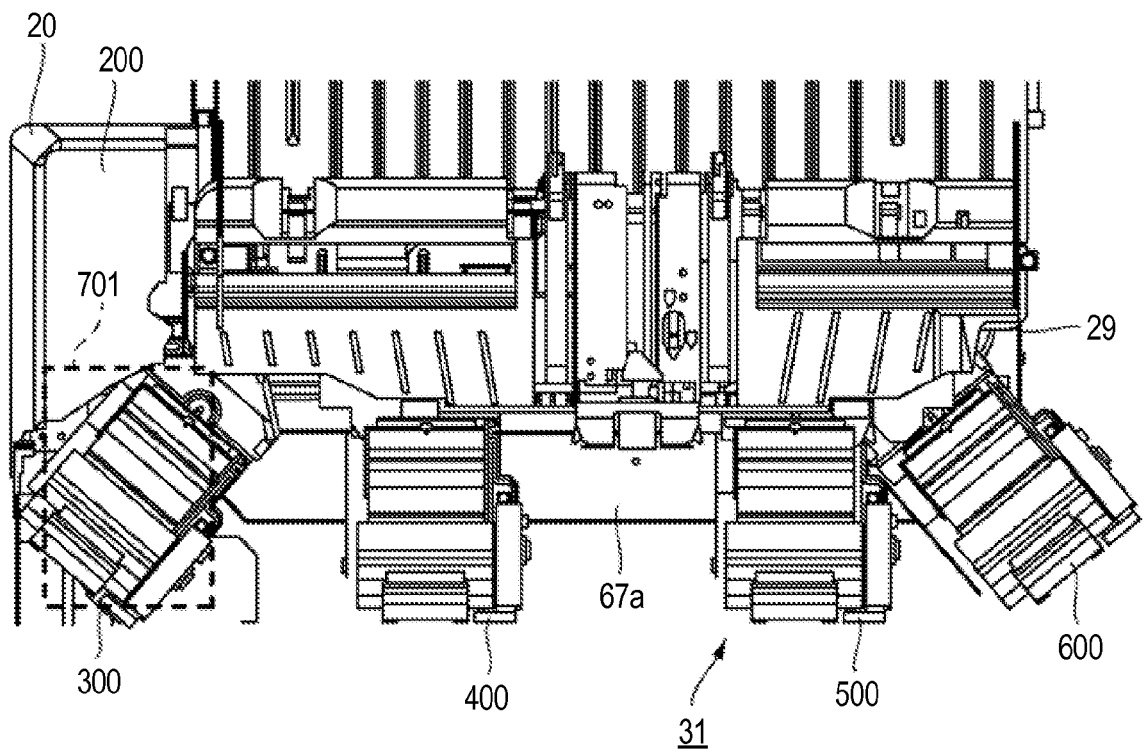
FIG. 16 is an explanatory top view of a binding position of the edge-binding stapling unit of the sheet post-processing apparatus in FIG. 1.

In the embodiment, as shown in FIG. 8, the opening portion 200 is provided over a corner of the casing 20 from a front side of the apparatus (a near side of FIG. 8) to a left side surface of the casing 20. In this constitution, a position, to which the edge-binding stapling unit 31 is moved for the manual stapling, is a binding position 701 illustrated in FIG. 16. In FIG. 16, the corner left of the processing tray 29 (in which rib state structures are illustrated on a top surface thereof) corresponds to the opening portion 200 provided in the casing 20.

FIG. 16 illustrates a top view of the processing tray 29 and the edge-binding stapling unit 31 which is moved by the staple guide unit 67a (the same holds true for FIG. 11 described later). In FIG. 16, three binding positions 400, 500, 600 of the edge-binding stapling unit 31, for binding the sheet existing in the apparatus housing (e.g. a sheet fed in the apparatus and conveyed onto the processing tray 29), are illustrated.

A first binding position herein is a position for binding the sheet existing in the apparatus housing (e.g. a sheet fed in the apparatus and conveyed onto the processing tray 29). Moreover, a second binding position is a position for manual stapling on a sheet manually inserted from the outside through the opening portion 200 as described above. There may be some cases as to how the first binding position and the second binding position are arranged.

For example, there is a case where the (first) binding position for binding the sheet existing in the apparatus is one of the binding positions 400, 500, 600 facing the processing tray 29 (a part in which the rib state structures are illustrated on the top surface thereof), and the (second) binding position for binding the sheet manually inserted from the outside through the opening portion 200 is the binding position 701 different from the binding positions 400, 500, 600 in a limited way. In the case where the first and second binding positions are away from each other, a partition (not shown) is provided. The partition prevents the sheet (e.g. the sheet manually inserted from the outside through the opening portion 200) from being inserted into an area of the processing tray 29 (the part in which the rib state structures are illustrated on the top surface thereof).

According to a type of the post-processing apparatus, there may be a case where the first and second binding portions are not separated clearly. That is, it is a case where the sheet, which is manually inserted through the opening portion 200 as shown in FIG. 8, is not regulated with the above described partition (not shown), and the sheet can be inserted into the area of the processing tray 29 (the part in which the rib state structures are illustrated on the top surface thereof). In this case, the sheet manually inserted through the opening portion 200 can be bound at the binding positions 400, 500, 600 facing the processing tray 29 in a manner similar to the sheet fed in the apparatus. For example, the user inserts a sheet bundle into the opening portion 200 and manually operates the switch 220. Then, the edge-binding stapling unit 31 can perform the edge-binding by the driver and the anvil 65. However, in this case, another mechanism, which retracts the switchback rollers 26 and the slip roller 51 so as to prevent from interfering with the sheet manually inserted through the opening portion 200, may be required.

When the sheet bound at the first and second binding positions is close to the access position 300, even if the first and second binding positions are arranged in the positions described in the above cases, a problem in which the manually-inserted sheet is damaged may occur by performing the setting operation of the edge-binding stapling unit 31 at the access position 300. For example, in a state where the sheets conveyed in the apparatus housing are aligned on the processing tray 29, there may be a case where the maintenance operation at the access position 300 is necessary due to the shortage of the staples at this timing. Moreover, when the second binding position 701 is arranged in a vicinity of the access position 300 as shown in FIGS. 8, 10B and 16, the sheet manually inserted through the opening portion 200 may be flawed by the setting operation of the edge-binding stapling unit 31 positioned at the access position 300.

During the manual stapling performed by the user (or the service engineer), when the jam recovery operation or the staple replenishment is required, the user pulls out the cartridge 66 to perform the jam recovery operation or the staple replenishment. When the cartridge 66 is then mounted to the edge-binding stapling unit 31 again, the user tends to determine that the manual stapling process can be restarted immediately. However, according to the specifications of this embodiment, in actuality, the edge-binding stapling unit 31 performs the setting operation. When the user does not recognize that the setting operation is to be performed at this timing, immediately after the cartridge 66 is mounted to the edge-binding stapling unit 31, the user may insert a sheet bundle SA into the opening portion 200. When such an operation is performed, the sheet bundle SA may enter a clinching operation region of the edge-binding stapling unit 31 to damage the sheet bundle SA.

In order to prevent the above-mentioned trouble, at the time of the setting operation to be performed after the edge-binding stapling unit 31 is moved to the access position, an appropriate protection measure is required to be taken. In this embodiment, as one mode of the protection measure, for example, the edge-binding stapling unit 31 is controlled to move to the protection position (refer to FIG. 11 described latter). For example, the protection position 301 is illustrated in FIG. 11. The edge-binding stapling unit 31 in the protection position 301 is prevented from interfering with the sheet on the processing tray 29 to be bound at the first binding positions 400, 500, 600 or the manually-inserted sheet to be bound at the second binding position. Specifically, in this protection measure, for example, the edge-binding stapling unit 31 is moved to an inner side of the apparatus than the access position 300 and then the edge-binding stapling unit 31 is caused to perform the setting operation (FIG. 11). Further, as another mode of the protection measure, a shutter mechanism (FIGS. 12A and 12B), which is configured to shield an operation portion of the edge-binding stapling unit 31 from an outside of the apparatus, is added, and the opening portion 200 is closed when the setting operation is performed so as to prevent the sheet bundle SA from being inserted thereinto.

In particular, in the structure as illustrated in FIG. 8, the access position of the edge-binding stapling unit 31 is close to the opening portion 200. Therefore, when foreign matters are inserted into the opening portion 200 during the setting operation, the foreign matters may be bitten during the clinching operation. The edge-binding stapling unit 31 may fail due to the bitten foreign matters. Further, when the sheet bundle is inserted from the opening portion during the setting operation, the sheet bundle may be flawed or damaged.

Figure 10A:
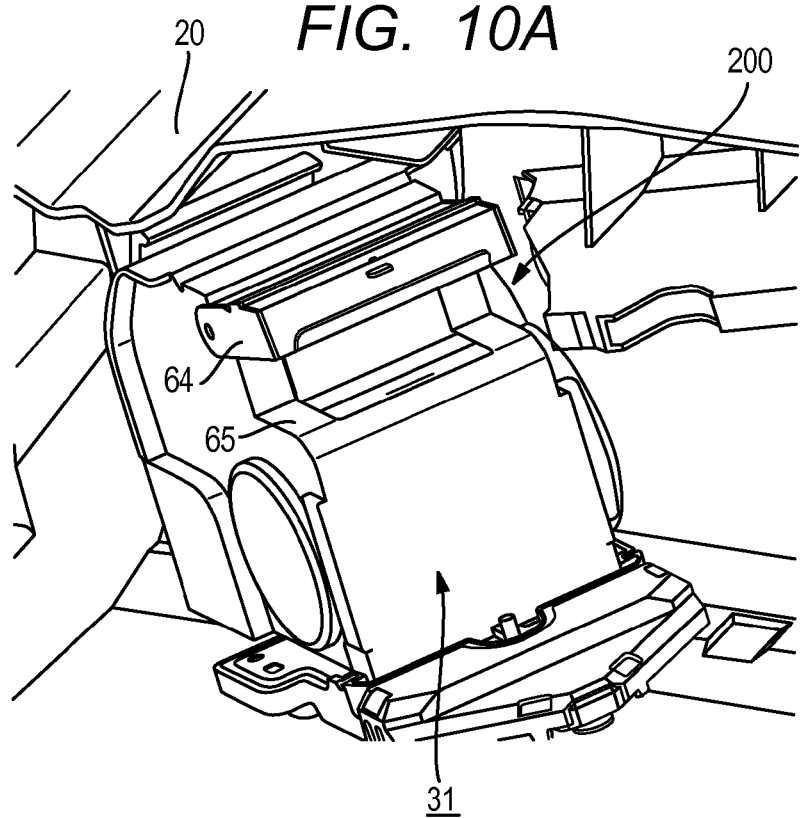
FIG. 10A is an explanatory view of a positional relationship between the access position of the edge-binding stapling unit and an opening portion when viewed from an inner side of a casing of the sheet post-processing apparatus in FIG. 1.
Figure 10B:
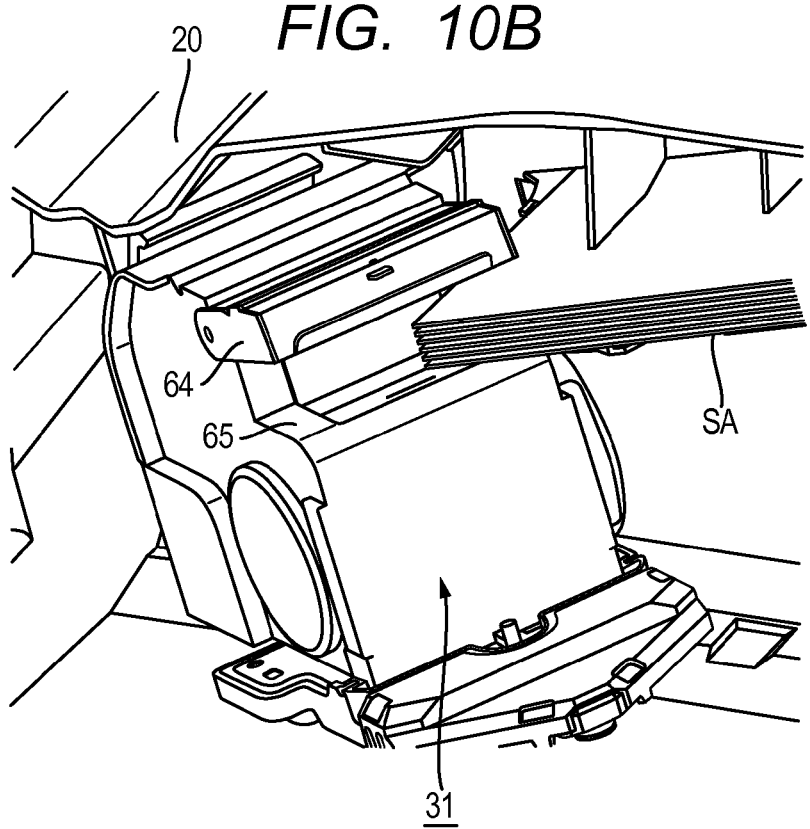
FIG. 10B is an explanatory view of a state in which a sheet bundle is inserted into the opening portion when viewed from the inner side of the casing of the sheet post-processing apparatus in FIG. 1.

FIGS. 10A and 10B illustrate a state of the edge-binding stapling unit 31 moved to the access position when viewed from an inner side of the casing 20. As illustrated in FIG. 10A, the access position of the edge-binding stapling unit 31 and the opening portion 200 are close to each other, and when the foreign matters are inserted, the foreign matters may be bitten during the clinching operation. FIG. 10B illustrates a state in which the sheet bundle SA is inserted into the opening portion 200 to perform the manual stapling operation. When the setting operation is performed in such a state, it may be bitten during the clinching operation to damage the sheet bundle SA. In a constitution which allows the sheet to be manually inserted, even if the first and second binding positions are away from each other or are not separated clearly, the state illustrated in FIG. 10B may similarly occur.

FIG. 11 illustrates different moving positions (300, 400, 500, and 600) of the edge-binding stapling unit 31 from a top of the apparatus. In FIG. 11, the moving positions 400, 500, and 600 respectively correspond to the binding positions such as a center portion, a corner portion, and the like of the sheet. In particular, the moving position 300 in FIG. 11 corresponds to the access position of the edge-binding stapling unit 31 illustrated in FIG. 8. The access position 300 is close to the opening portion 200 for the manual stapling operation as described above. Therefore, it is not desired that the setting operation of the edge-binding stapling unit 31 is performed at the access position.

In this embodiment, when the setting operation is required, the edge-binding stapling unit 31 is moved to at least the position 301 slightly closer to the inner side of the apparatus than the access position 300. The edge-binding stapling unit 31 in the protection position 301 is prevented from interfering with both the sheet on the processing tray 29 to be bound at the first binding positions 400, 500, 600 and the manually-inserted sheet to be bound at the second binding position. There may be a case where a sheet sensor (not shown) provided on the processing tray 29 clearly detects absence of the sheet on the processing tray 29 facing the first binding positions 400, 500, 600. In this case, the protection position, to which the edge-binding stapling unit 31 is moved from at least the access position 300 for the setting operation, may be the first binding positions 400, 500, 600. That is, in this embodiment, as the protection measure, the edge-binding stapling unit 31 is moved to the position different from the access position 300, and then the setting operation is performed.

According to this embodiment, the sheet bundle, which may be inserted into the opening portion 200 for the manual stapling, or the edge-binding stapling unit 31 can be protected. That is, when the setting operation is required, the edge-binding stapling unit 31 is moved to the moving position 400, 500, or 600 or the operation position 301, and then the setting operation is performed. With this, even when the foreign matters or the sheet bundle is inserted from the opening portion 200, the foreign matters or the sheet bundle may not be bitten through the clinching operation, with the result that the edge-binding stapling unit 31 can be protected.

Figure 12A:
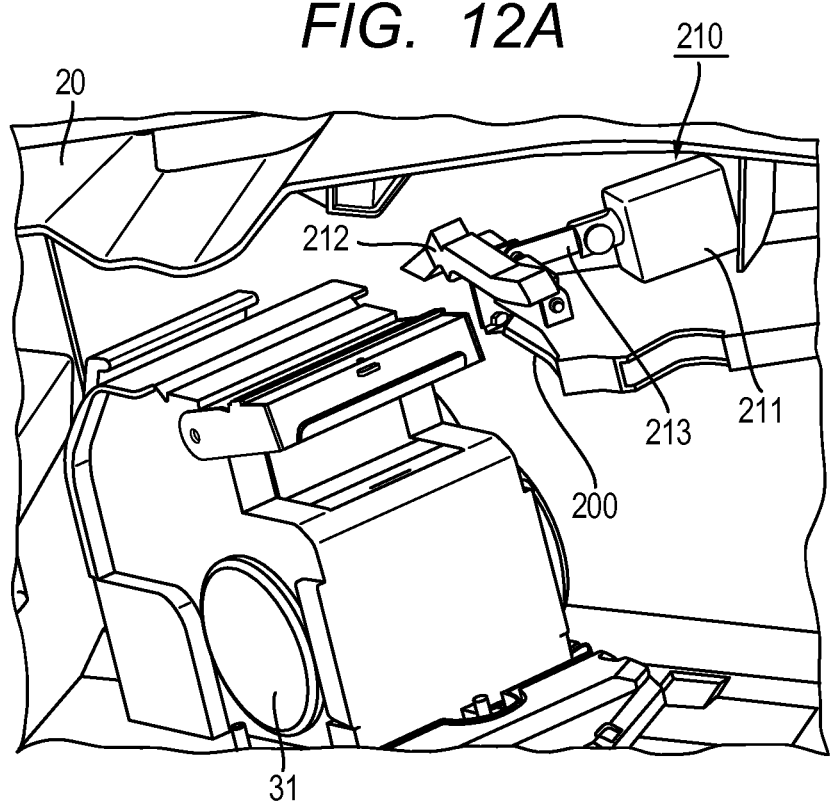
FIG. 12A is an explanatory view of a state in which a shutter mechanism is mounted to the opening portion of the sheet post-processing apparatus in FIG. 1, and a shutter member is retreated to open the opening portion.
Figure 12B:
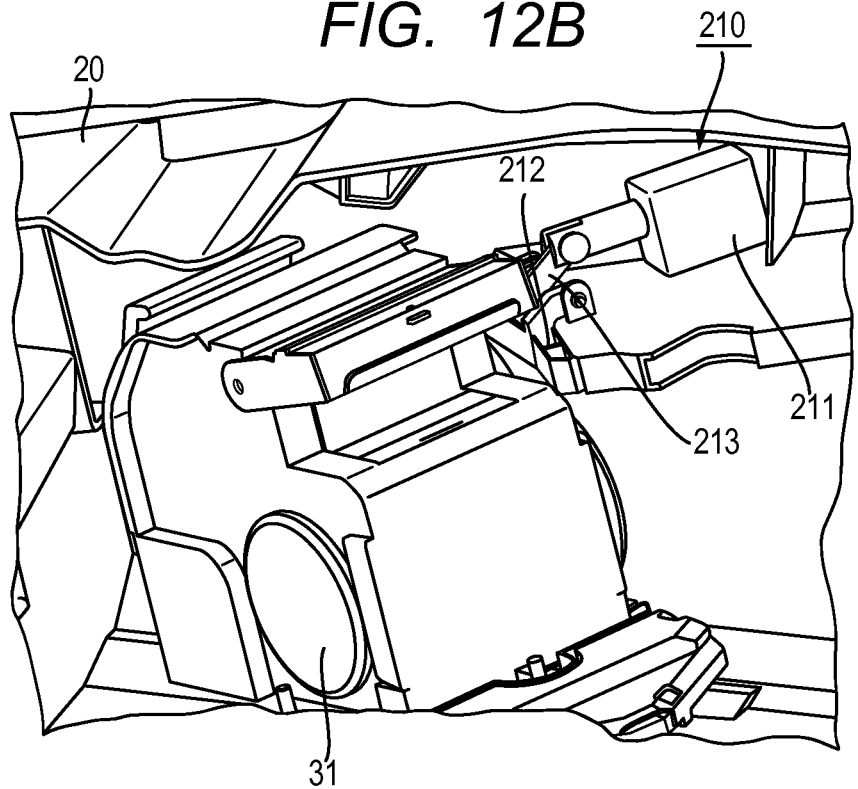
FIG. 12B is an explanatory view of a state in which the shutter mechanism is mounted to the opening portion of the sheet post-processing apparatus in FIG. 1, and the shutter member closes the opening portion.
Figure 13:
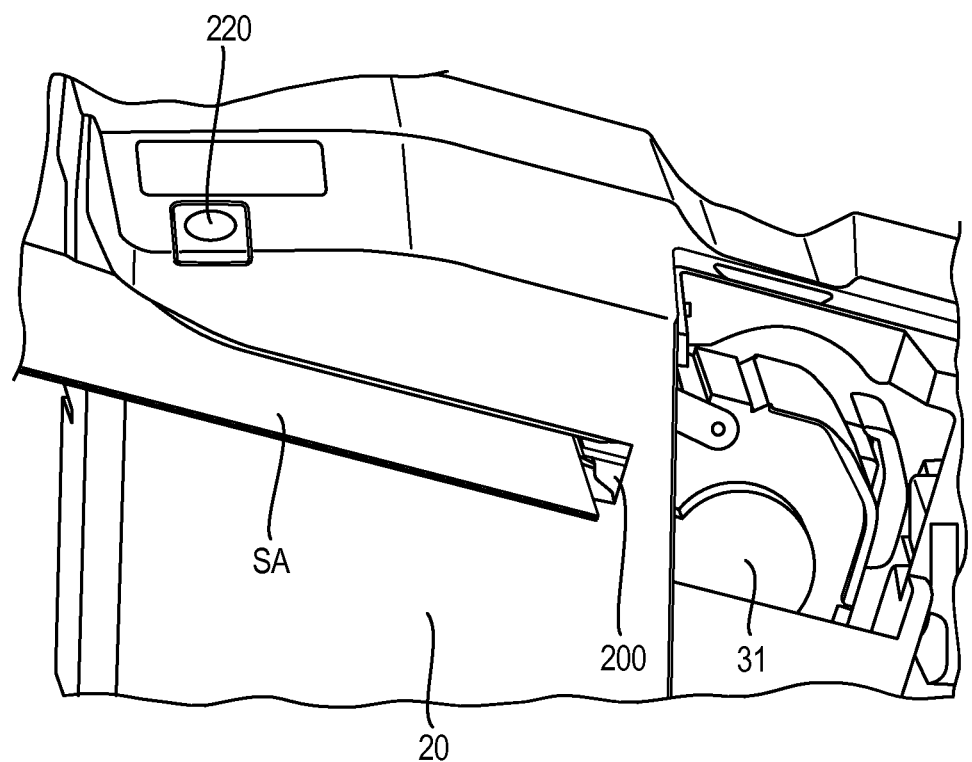
FIG. 13 is an explanatory view of an operation of performing manual stapling by inserting the sheet bundle into the opening portion in the sheet post-processing apparatus in FIG. 1.

In order to protect the sheet bundle, which may be inserted into the opening portion 200 for the manual stapling, or the edge-binding stapling unit 31, the structures as illustrated in FIGS. 12A, 12B, and 13 are conceivable in addition to the above-mentioned structures.

In the structure illustrated in FIGS. 12A and 12B, the mechanism for the protection measure is arranged in the vicinity of the opening portion 200 and the edge-binding stapling unit 31. As the mechanism for the protection measure, a shutter unit of shielding the operation portion of the edge-binding stapling unit 31 from the outside of the apparatus is arranged. As the shutter unit (regulating unit), for example, as illustrated in FIGS. 12A and 12B, a shutter mechanism 210 is mounted to the vicinity of the edge-binding stapling unit 31. The shutter mechanism 210 in FIGS. 12A and 12B includes a shutter driving member 211, a shutter member (opening and closing unit) 212, and a link 213 configured to couple the shutter driving member 211 and the shutter member 212 to each other. Of those, the shutter driving member 211 is, for example, a solenoid, and the link 213 is, for example, a lever configured to be controlled in posture by a cam (not shown). The shutter member 212, which is configured to be driven so as to be opened or closed by the shutter driving member 211 through intermediation of the link 213, has, for example, a shape capable of performing the following operations.

FIG. 12A illustrates a state in which the shutter member 212 is retreated to open the opening portion 200. Further, FIG. 12B illustrates a state in which the opening portion 200 is closed by the shutter member 212. In particular, in a posture illustrated in FIG. 12A, a shape of a surface of the shutter member 212, which faces downward in FIG. 12A, corresponds to a shape of an end edge of the opening portion 200. Thus, when the shutter member 212 is pivoted by the link 213 and the shutter driving member 211 as illustrated in FIG. 12B, a surface of the shutter member 212, which is illustrated as a lower surface in FIG. 12A, reliably shields the opening portion 200 along the end edge of the opening portion 200.

In this case, the opening portion 200 is a path for causing a main part of the edge-binding stapling unit 31 and the outside of the apparatus to communicate to each other at the access position of the edge-binding stapling unit 31. Thus, through closure of the opening portion 200 by the shutter member 212 of the shutter mechanism 210, the protection measure of shielding a mechanism portion of the edge-binding stapling unit 31 (binding unit) from the outside of the apparatus can be taken.

In this embodiment, the shutter member 212 and the shutter driving member 211 are coupled to each other through intermediation of the link 213 serving as a coupling member. However, a gear-shaped member or a cam-shaped member may be used as the coupling member so that the shutter member 212 and the shutter driving member 211 are moved in association with each other. In addition, the shutter member 212 may be arranged on a moving locus of the edge-binding stapling unit 31 so that an opening and closing operation of pushing up the shutter member 212 along with the movement of the edge-binding stapling unit 31 is performed.

With the arrangement of the shutter member 212, during the setting operation of the edge-binding stapling unit 31, the operation portion of the edge-binding stapling unit 31 can be shielded from the outside of the apparatus (opening portion 200). With this, the foreign matters or the sheet bundle is prevented from being inserted during the clinching operation accompanying the setting operation of the edge-binding stapling unit 31, with the result that the sheet bundle or the edge-binding stapling unit 31 can reliably be protected.

A control system of the sheet post-processing apparatus B and an example of a control procedure to be executed when the control system performs the maintenance operation on the edge-binding stapling unit 31 at the access position are now described with reference to FIGS. 14 and 15.

Figure 14:
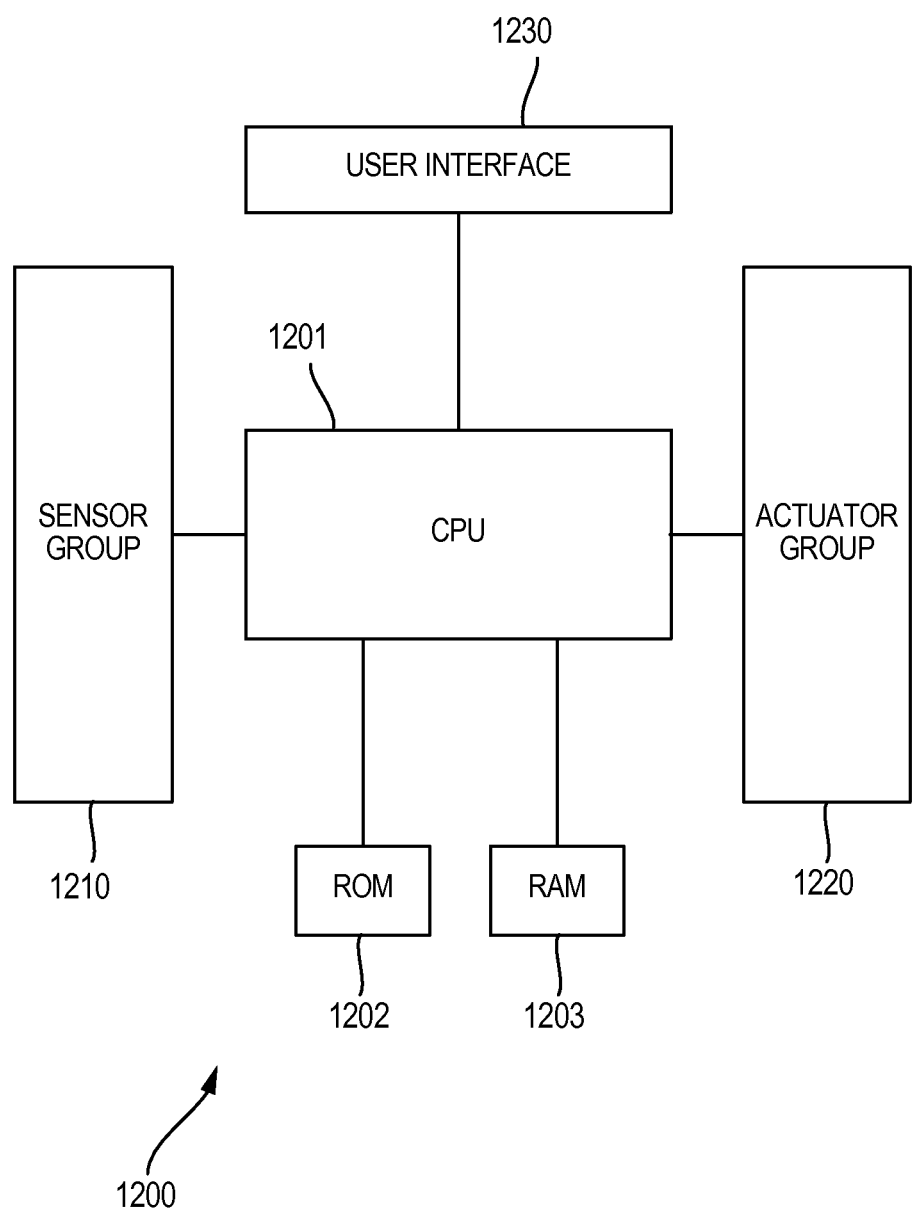
FIG. 14 is a block diagram of a configuration of a control system of the sheet post-processing apparatus in FIG. 1.

FIG. 14 illustrates a schematic configuration of the control circuit provided as a control unit of the sheet post-processing apparatus B. The control circuit in FIG. 14 includes a CPU 1201 configured to control the entire sheet post-processing apparatus B. A ROM 1202 configured to store the control procedure as a program of the CPU 1201 and a RAM 1203 to be used by the CPU 1201 as a working area are each connected to the CPU 1201. A sensor group 1210 illustrated as one block on the left side in FIG. 14 includes the various sensors provided in the sheet post-processing apparatus B.

That is, the sensor group 1210 includes the jam sensor or the remaining-amount sensor for the staple, which is provided inside the edge-binding stapling unit 31. Those sensors in the edge-binding stapling unit 31 are each a detecting unit configured to detect whether or not the staple can normally be driven.

Further, an actuator group 1220 illustrated as one block on the right side in FIG. 14 includes the various motors or solenoids in the sheet post-processing apparatus B. In particular, regarding the control in this embodiment, the actuator group 1220 includes the staple motor 60 and the shutter driving member 211 (solenoid). Further, a user interface 1230 of the sheet post-processing apparatus B is connected to the CPU 1201. The user interface 1230 includes, for example, the switch, the keyboard, and the display. Regarding the control in this embodiment, the user interface 1230 includes, for example, the switch configured to instruct the manual stapling (switch 220 in FIGS. 8 and 13).

The respective sections illustrated in FIG. 14 are connected via an interface unit such as a system bus. For example, an interface unit of an arbitrary interface standard may be used depending on the product specifications of the CPU 1201 to be employed.

The CPU 1201 in FIG. 14 is configured to perform the post-processing on the sheet carried in from the image forming apparatus A in accordance with a mode designated via the user interface 1230. Examples of the mode of the post-processing include the "print out mode", the "offset mode", the "binding finish mode", and the "booklet finish mode". Of those, in the "binding finish mode" and the "booklet finish mode", the binding process by the edge-binding stapling unit 31 is performed.

Figure 15:
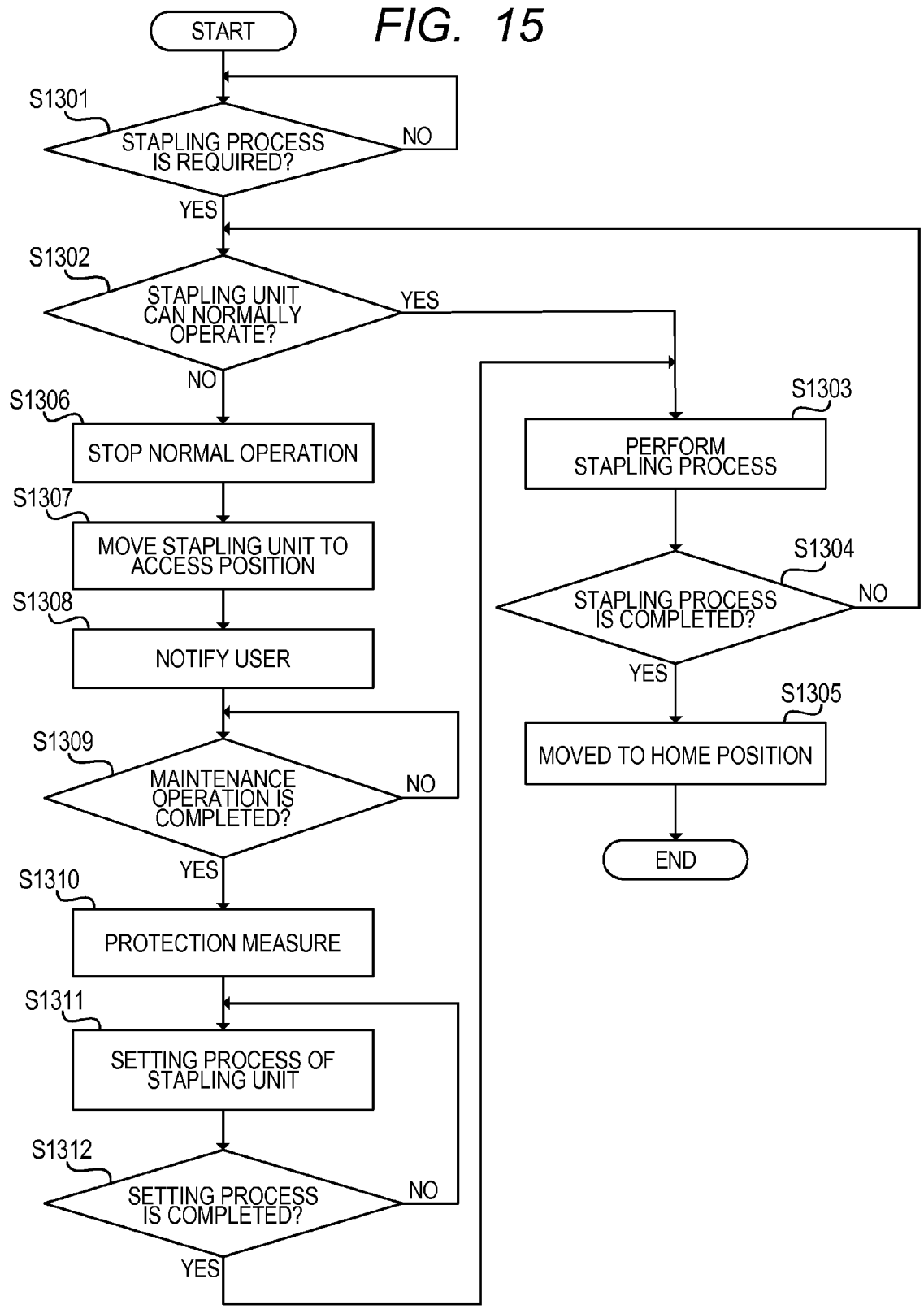
FIG. 15 is a flowchart of a control procedure of the edge-binding stapling unit, which is performed by the control system in FIG. 14.

FIG. 15 illustrates an example of the control procedure of the edge-binding stapling unit 31 to be performed by the CPU 1201. The procedure in FIG. 15 can be stored in the ROM 1202 (or another appropriate storage unit) as the control program of the CPU 1201.

A "normal operation" in Step S1306 in FIG. 15 indicates post-processing, that the sheet post-processing apparatus B performs on the sheet carried in from the image forming apparatus A, in particular the post-processing for performing the stapling process of the edge-binding stapling unit 31. The mode of the post-processing is designated via the user interface 1230. In Step S1301, the CPU 1201 determines whether or not the post-processing for performing the stapling process is designated via the user interface 1230.

When the stapling process is not designated in Step S1301 (NO in S1301), the edge-binding stapling unit 31 is brought into a standby state until the stapling process is designated. When the stapling process is designated (YES in S1301), the CPU 1201 determines whether or not the edge-binding stapling unit 31 can normally drive the staple via the sensor group 1210 (Step S1302).

When the CPU 1201 determines in Step S1302 that the edge-binding stapling unit 31 can normally drive the staple (YES in S1302), the stapling process is performed in accordance with an instruction via the user interface 1230 (Step S1303).

Then, the CPU 1201 determines whether or not the stapling process designated in Step S1301 is completed (Step S1304). When the stapling process is not completed (NO in S1304), the process returns to Step S1302, and the stapling process in Step S1303 is continued as long as the normal operation of the edge-binding stapling unit 31 is possible. When the stapling process is completed (YES in S1304), the edge-binding stapling unit 31 is moved to a home position (not shown) located on the inner side of the apparatus than the access position 300 (FIG. 11) (Step S1305), to thereby complete the flow in FIG. 15. On the other hand, when the sensor group 1210 detects that the edge-binding stapling unit 31 cannot normally drive the staple (NO in S1302), the process proceeds to Step S1306.

The CPU 1201 stops the normal operation of the sheet post-processing apparatus B in Step S1306, and causes the edge-binding stapling unit 31 to move to the access position 300 (FIG. 11) through intermediation of the moving unit in Step S1307. In accordance therewith, the CPU 1201 notifies the user, by a sound or an output on the display of the user interface 1230, that a problem, such as the jam and the shortage of the staples, occurs in the edge-binding stapling unit 31, or that the maintenance operation is required (Step S1308).

In response to this, the user (or the service engineer) performs the maintenance operation such as the jam recovery operation or the staple replenishment. The completion of the maintenance operation is detected in Step S1309. For example, in Step S1309, the sensor group 1210 can detect that the edge-binding stapling unit 31 returns to the normal state (the maintenance operation is completed) based on non-detection of the staple jam or the detection of the remaining amount of the staples. Alternatively, the completion of the maintenance operation may be detected under a condition that the cover of the opening portion 20d at the access position is closed and a predetermined operation is performed on the user interface 1230.

When the maintenance operation is completed (YES in S1309), in order to guarantee that the binding process can reliably be performed from a subsequent drive of the edge-binding stapling unit 31, the setting process of the stapling unit is performed. In this embodiment, prior to this process, the protection measure for protecting the sheet bundle or the edge-binding stapling unit 31 is taken (Step S1310).

As the protection measure in Step S1310, the CPU 1201 can control the edge-binding stapling unit 31 to move to a different position from the access position. The CPU 1201, for example, performs the setting after causing the edge-binding stapling unit 31 to move to the position 301 located closer to the inner side of the apparatus in FIG. 11. With this, the sheet bundle or the edge-binding stapling unit 31 can reliably be protected.

Further, in the structure using the shutter unit as illustrated in FIGS. 12A and 12B, as the protection measure in Step S1310, the CPU 1201 performs control of shielding the operation portion of the edge-binding stapling unit 31 from the outside of the apparatus (for example, the opening portion 200). In this case, the CPU 1201, for example, performs the setting after actuating the shutter member 212 illustrated in FIGS. 12A and 12B to shield the operation portion of the edge-binding stapling unit 31 from the outside of the apparatus. With this, the sheet bundle or the edge-binding stapling unit 31 can reliably be protected.

After taking the protection measure, the CPU 1201 causes the setting process of the stapling unit to be performed in Step S1311. When the setting process is completed (YES in S1312), the CPU 1201 causes the operation of the apparatus to restore to the normal post-processing operation, and the process proceeds to Step S1303 so that the stapling process is performed. Then, the process is continued until the stapling process instructed in Step S1301 is completed. When the stapling process is completed (YES in S1304), the edge-binding stapling unit 31 is moved to the home position (S1305), and the flow in FIG. 15 is completed. Further, when the setting process is not completed (NO in S1312), the setting process of the edge-binding stapling unit 31 (S1311) is continued until the setting process is completed.

With the above-mentioned control, the protection measure (Step S1310) can be taken regarding the setting process to be performed after the maintenance operation to be performed in accordance with the operation of the edge-binding stapling unit 31. In the protection measure (Step S1310), the setting is performed after the edge-binding stapling unit 31 is moved to the different position from the access position or the shutter member 212 is actuated. With this, the sheet bundle or the edge-binding stapling unit 31 can reliably be protected.

Further, even when the setting process is performed at the access position but the components or the conveyance path in the apparatus is bitten, the components or the conveyance path in the apparatus can be protected according to this embodiment. Then, the failure of the edge-binding stapling unit 31 due to the bite of the components or the conveyance path in the apparatus can be prevented.

The protection position, to which the edge-binding stapling unit 31 is moved in the protection measure (Step S1310) and which is different from the access position 300, is one of the various protection positions which are respectively described as the above protection position 301.

For example, the edge-binding stapling unit 31 (binding unit) is movable to the positions including:
(1) the first binding position at which a first binding operation is performed using a binding member on the sheet which has been conveyed in the apparatus housing;
(2) the second binding position at which a second binding operation is performed on the sheet inserted from the outside through the opening portion 200 and which is different from the first binding position; and
(3) the access position in which the user is accessible to edge-binding stapling unit 31 (binding unit).

In the protection measure in which the edge-binding stapling unit 31 performs the setting operation, the edge-binding stapling unit 31 is moved to a position at which the edge-binding stapling unit 31 is prevented from interfering with the sheet to be bound at the first binding positions or the second binding position. Then, the edge-binding stapling unit 31 performs the setting operation. Thereby, for example, the sheet stacked on the processing tray 29 so as to be bound at the first binding positions and the sheet manually inserted from the opening portion 200 so as to be bound at the second binding position can be protected, especially.

While the present invention has been described with reference to exemplary embodiments, it is to be understood that the present invention is not limited to the disclosed exemplary embodiments, and modifications may be made thereto as appropriate without departing from the gist of the present invention. For example, in the above-mentioned embodiment, an electrophotographic method is exemplified as an image forming method for the image forming apparatus. The image forming method or the other configurations in the image forming apparatus are not essential requirements for the present invention. The image forming apparatus may have any configuration as long as the apparatus can feed the sheet, which is to be subjected to the post-processing, to the sheet post-processing apparatus.

The present invention is suitably carried out in a sheet post-processing apparatus configured to perform an edge-binding process on a sheet by an edge-binding staple unit, and, in particular, perform a staple-setting operation after moving the edge-binding stapling unit to an access position for a maintenance operation. Note that, of the above-mentioned protection measures, the control of shielding of an operation portion of the edge-binding stapling unit from an outside of the apparatus by a shutter member may be executed in a normal binding operation as well as the setting operation. In particular, when the edge-binding is performed at a binding position close to an access position (for example, the access position 300 in FIG. 11), a passage (opening portion for manual stapling) communicating to the outside of the apparatus can be shielded by the shutter member. In this case, for example, a shape of the shutter member only needs to be determined so that the normal binding operation of the edge-binding stapling unit is not hindered and only a passage communicating to the outside of the apparatus is shielded.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-097610, filed May 9, 2014 and 2015-081197, filed Apr. 10, 2015 which are hereby incorporated by reference herein in their entirety.

What is claimed is:

1. A sheet processing apparatus comprising:
 a binder configured to perform a binding process using a binding member, the binder movable to (i) a binding position at which the binder performs the binding process on a sheet, (ii) an access position at which the binder is accessible to a user for replenishing a binding member into the binder by the user, and (iii) a setting position at which a setting operation is performed; and
 a controller configured to cause the binder to move to the setting position after a binding member is replenished to the binder at the access position, and then, while at the setting position different from the access position and the binding position, to perform the setting operation in which the binding member is moved from a replenished position to a usable position in the binder, the replenished position being a position at which the binding member is replenished by the user, and the usable position being a position at which the binder is enabled to perform the binding process using the binding member.

2. A sheet processing apparatus according to claim 1, wherein the controller causes the binder to perform the setting operation after causing the binder to move to an inner side of the sheet processing apparatus.

3. A sheet processing apparatus according to claim 1, wherein the binder performs a first binding process on the sheet at the binding position, and is movable to a second binding position at which the binder performs a second binding process on a sheet to be inserted from an opening portion,
 wherein the second binding position is different from the binding position, and
 wherein, at the setting position, the binder does not interfere with a sheet to be bound in the binding position or the second binding position.

4. A sheet processing apparatus according to claim 1, further comprising:
 a detector configured to detect whether or not the binder is capable of normally driving a binding member,
 wherein the controller is further configured to cause the binder to move to the access position when the detector detects that the binder is incapable of normally driving a binding member.

5. A sheet processing apparatus according to claim 4, wherein the detector detects that the binder is incapable of normally driving a binding member when a binding member is in a jam state or when there is a shortage of binding members.

6. A sheet processing apparatus according to claim 1, wherein the binder is prevented from acting on a sheet or foreign matter in the setting position different from the access position.

7. A sheet processing apparatus according to claim 1, wherein the sheet processing apparatus is connectable with an image forming apparatus configured to form an image on a sheet, and the binder performs the binding process on the sheet on which the image forming apparatus forms the image.

8. A sheet processing apparatus according to claim 1, wherein the controller performs the binding process on a sheet by performing a clinching operation in a state in which a binding member is at the usable position, and the controller controls the binder so as to perform the setting operation, in which a binding member is moved from the replenished position to the usable position with respect to the binder, by performing the clinching operation multiple times after a jam recovery operation for the binding member or replenishment of the binding member.

9. A sheet processing apparatus, comprising:
 a binder configured to perform a binding process on a sheet in a state in which the sheet has been inserted from outside of the sheet processing apparatus through an opening portion into which a sheet is insertable; and
 a barrier configured to regulate the sheet so that the sheet is prevented from being inserted from the opening portion when the binder performs a setting operation in which a binding member is moved from a replenished position to a usable position in the binder.

10. A sheet processing apparatus according to claim 9, wherein the binder is movable to (i) a first binding position at which the binder performs another binding process, which is different from the binding process to be performed on a sheet inserted through the opening portion, by using a binding member on a sheet, (ii) a second binding position at which the binding process is performed on the sheet to be inserted from the opening portion, and (iii) an access position at which the binder is accessible to a user, and
 wherein the barrier is further configured to regulate the sheet so that the sheet is prevented from being inserted from the opening portion when the binder performs the setting operation after the binder is moved to the access position.

11. A sheet processing apparatus according to claim 10, further comprising:
 a delivery port through which a sheet subjected to the binding process by the binder at the first binding position is delivered to the outside of the sheet processing apparatus, and which is different from the opening portion.

12. A sheet processing apparatus according to claim 9, wherein the barrier has an opening and closing unit configured to open and close the opening portion, and
 wherein the opening and closing unit closes the opening portion when the binder performs the setting operation.

13. A sheet processing apparatus according to claim 12, wherein the opening and closing unit closes the opening portion when the binder performs another binding process using a binding member on a sheet.

14. A sheet processing apparatus according to claim 9, further comprising:
a detector configured to detect whether or not the binder is capable of normally driving a binding member,
wherein, when the detector detects that the binder is incapable of normally driving a binding member, the binder is moved to an access position at which the binder is accessible to a user.

15. A sheet processing apparatus according to claim 14, wherein the detector detects that the binder is incapable of normally driving a binding member when a binding member is in a jam state or when there is a shortage of binding members.

16. A sheet processing apparatus according to claim 9, wherein the sheet processing apparatus is connectable with an image forming apparatus configured to form an image on a sheet, and the binder performs the binding process on the sheet on which the image forming apparatus forms the image.

17. A sheet processing apparatus according to claim 9, wherein the controller performs the binding process on a sheet by performing a clinching operation in a state in which a binding member is at the usable position, and the controller controls the binder so as to perform the setting operation, in which a binding member is moved from the replenished position to the usable position with respect to the binder, by performing the clinching operation multiple times after a jam recovery operation for the binding member or replenishment of the binding member.

18. An image forming apparatus, comprising:
an image forming section configured to form an image on a sheet;
a binder configured to perform a binding process using a binding member, the binder movable to (i) a binding position at which the binder performs the binding process on the sheet having the image formed thereon by the image forming section, (ii) an access position at which the binder is accessible to a user for replenishing a binding member into the binder by the user, and (iii) a setting position at which a setting operation is performed; and
a controller configured to cause the binder to move to the setting position after a binding member is replenished to the binder at the access position, and then, while at the setting position different from the access position and the binding position, to perform the setting operation in which the binding member is moved from a replenished position to a usable position in the binder, the replenished position being a position at which the binding member is replenished by the user, and the usable position being a position at which the binder is enabled to perform the binding process by using the binding member.

19. An image forming apparatus, comprising:
an image forming section configured to form an image on a sheet;
a binder configured to perform a binding process on a sheet in a state in which the sheet has been inserted from outside of the image forming apparatus through an opening portion into which a sheet is insertable; and
a barrier configured to regulate the sheet so that the sheet is prevented from being inserted from the opening portion when the binder performs a setting operation in which a binding member is moved from a replenished position to a usable position in the binder.

20. A sheet processing apparatus, comprising:
a binder configured to perform a binding process on a sheet to be inserted from an opening portion;
a delivery port through which a sheet within the sheet processing apparatus is delivered to an outside of the sheet processing apparatus, and which is different from the opening portion;
a barrier configured to regulate the sheet so that the sheet is prevented from being inserted from the opening portion; and
a controller configured to control the barrier to close the opening portion when the binder performs a setting operation for a binding member.

21. A sheet processing apparatus according to claim 20, wherein the binder is movable to (i) a first binding position at which the binder performs another binding process, which is different from the binding process to be performed on a sheet inserted through the opening portion, by using a binding member on a sheet, (ii) a second binding position at which the binding process is performed on the sheet to be inserted from the opening portion, and (iii) an access position at which the binder is accessible to a user, and
wherein the barrier is further configured to regulate the sheet so that the sheet is prevented from being inserted from the opening portion when the binder performs the setting operation after the binder is moved to the access position.

22. A sheet processing apparatus according to claim 20, wherein the barrier has an opening and closing unit configured to open and close the opening portion, and
wherein the opening and closing unit closes the opening portion when the binder performs the setting operation.

23. A sheet processing apparatus according to claim 22, wherein the opening and closing unit closes the opening portion when the binder performs another binding process using a binding member on a sheet.

24. A sheet processing apparatus according to claim 20, further comprising:
a detector configured to detect whether or not the binder is capable of normally driving a binding member,
wherein, when the detector detects that the binder is incapable of normally driving a binding member, the binder is moved to an access position at which the binder is accessible to a user.

25. An image forming apparatus, comprising:
an image forming section configured to form an image on a sheet;
a binder configured to perform a binding process on a sheet to be inserted from an opening portion;
a delivery port through which a sheet within the image forming apparatus is delivered to an outside of the image forming apparatus, and which is different from the opening portion;
a barrier configured to regulate the sheet so that the sheet is prevented from being inserted from the opening portion; and
a controller configured to control the barrier to close the opening portion when the binder performs a setting operation for a binding member.

* * * * *